United States Patent
Radu et al.

(10) Patent No.: US 11,449,866 B2
(45) Date of Patent: Sep. 20, 2022

(54) ONLINE AUTHENTICATION

(71) Applicant: MASTERCARD INTERNATIONAL INCORPORATED, Purchase, NY (US)

(72) Inventors: Cristian Radu, Beauvechain (BE); Valerie Wouters, Genval (BE); Robert Gerard Ouellette, Westwood, NJ (US); Ryan Crowe, Long Island City, NY (US); Roshan L. Lewis, Bernardsville, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 69 days.

(21) Appl. No.: 16/679,577

(22) Filed: Nov. 11, 2019

(65) Prior Publication Data
US 2020/0175515 A1 Jun. 4, 2020

(30) Foreign Application Priority Data
Nov. 29, 2018 (EP) .................................... 18209328

(51) Int. Cl.
*G06Q 20/40* (2012.01)
*G06Q 20/36* (2012.01)

(52) U.S. Cl.
CPC ....... *G06Q 20/4014* (2013.01); *G06Q 20/367* (2013.01); *G06Q 20/409* (2013.01)

(58) Field of Classification Search
CPC . G06Q 20/4014; G06Q 20/367; G06Q 20/409
See application file for complete search history.

(56) References Cited

U.S. PATENT DOCUMENTS

2003/0200184 A1  10/2003  Dominguez et al.
2013/0282580 A1* 10/2013  O'Brien ............... G06Q 20/065
                                                                    705/44
(Continued)

FOREIGN PATENT DOCUMENTS

CN    107833032 A  *  3/2018  ........... G06Q 20/108
GB     2542617 A   *  3/2017  ....... G06Q 20/40145
(Continued)

OTHER PUBLICATIONS

P. Boontaetae, A. Sangpetch and O. Sangpetch, "RDI: Real Digital Identity Based on Decentralized PKI," 2018 22nd International Computer Science and Engineering Conference (ICSEC), 2018, pp. 1-6, doi: 10.1109/ICSEC.2018.8712663. (Year: 2018).*

(Continued)

*Primary Examiner* — Virpi H Kanervo
(74) *Attorney, Agent, or Firm* — Harness, Dickey & Pierce, P.L.C.

(57) ABSTRACT

A method of establishing a digital identity for use of an online service and of subsequently using the digital identity to perform the online service is described. A digital identity for the online service is bound to computer hardware associated with the digital identity. A user associated with the digital identity provides a user authentication at the computer hardware associated with the digital identity. The digital identity is enrolled for the online service, and a first instance of the online service for the digital identity is performed. A common user authentication process result completes enrolment of the digital identity and authenticates the digital identity for performing said first instance of the online service.

9 Claims, 26 Drawing Sheets

(56) References Cited

U.S. PATENT DOCUMENTS

| | | | |
|---|---|---|---|
| 2015/0032625 A1 | 1/2015 | Dill et al. | |
| 2015/0227920 A1 | 8/2015 | Sadiq et al. | |
| 2015/0254698 A1* | 9/2015 | Bondesen | G06Q 20/20 |
| | | | 705/14.17 |
| 2015/0348023 A1 | 12/2015 | Fisher et al. | |
| 2016/0019544 A1* | 1/2016 | Santosh | G06Q 20/4016 |
| | | | 705/44 |
| 2018/0075452 A1 | 3/2018 | Weller et al. | |
| 2018/0181964 A1* | 6/2018 | Zagarese | G06Q 20/367 |
| 2018/0330348 A1* | 11/2018 | Uhr | H04L 9/0637 |
| 2019/0089702 A1* | 3/2019 | Bhatt | H04W 12/06 |
| 2021/0051012 A1* | 2/2021 | Law | G06F 21/33 |

FOREIGN PATENT DOCUMENTS

| | | | |
|---|---|---|---|
| GB | 2542617 A | 3/2017 | |
| WO | WO-2019173251 A1 * | 9/2019 | H04L 29/06 |

OTHER PUBLICATIONS

Paul A. Grassi et al: "Digital Identity Guidelines", National Institute of Standards and Technology. Jun. 22, 2017, pp. 1-62; http://dx.doi.org/10.6028/NIST.SP.800-63-3.

EMVCo 3-D Secure; https://www.emvco.com/document-search/; web accessed Sep. 12, 2019; 4 pgs.

* cited by examiner

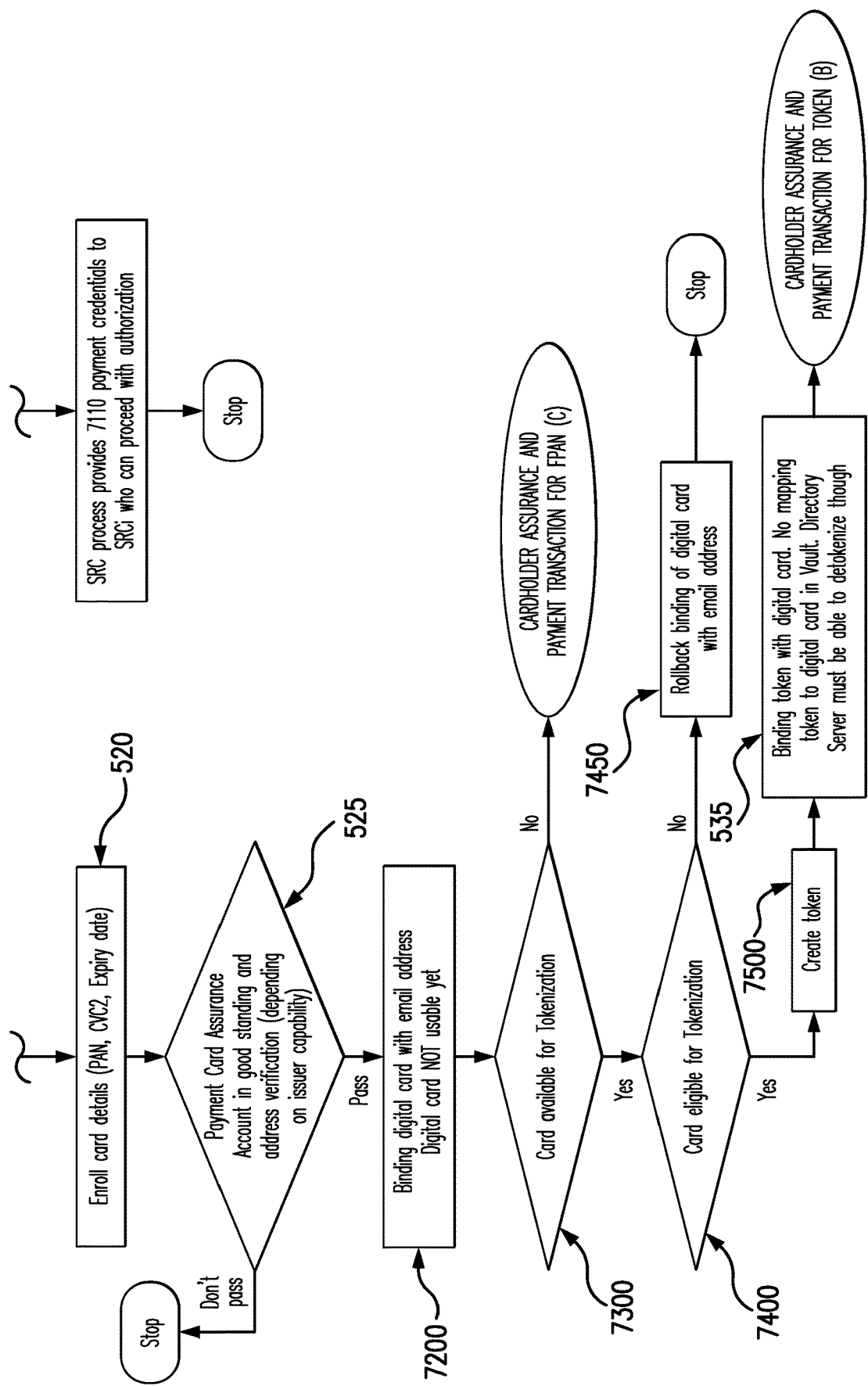

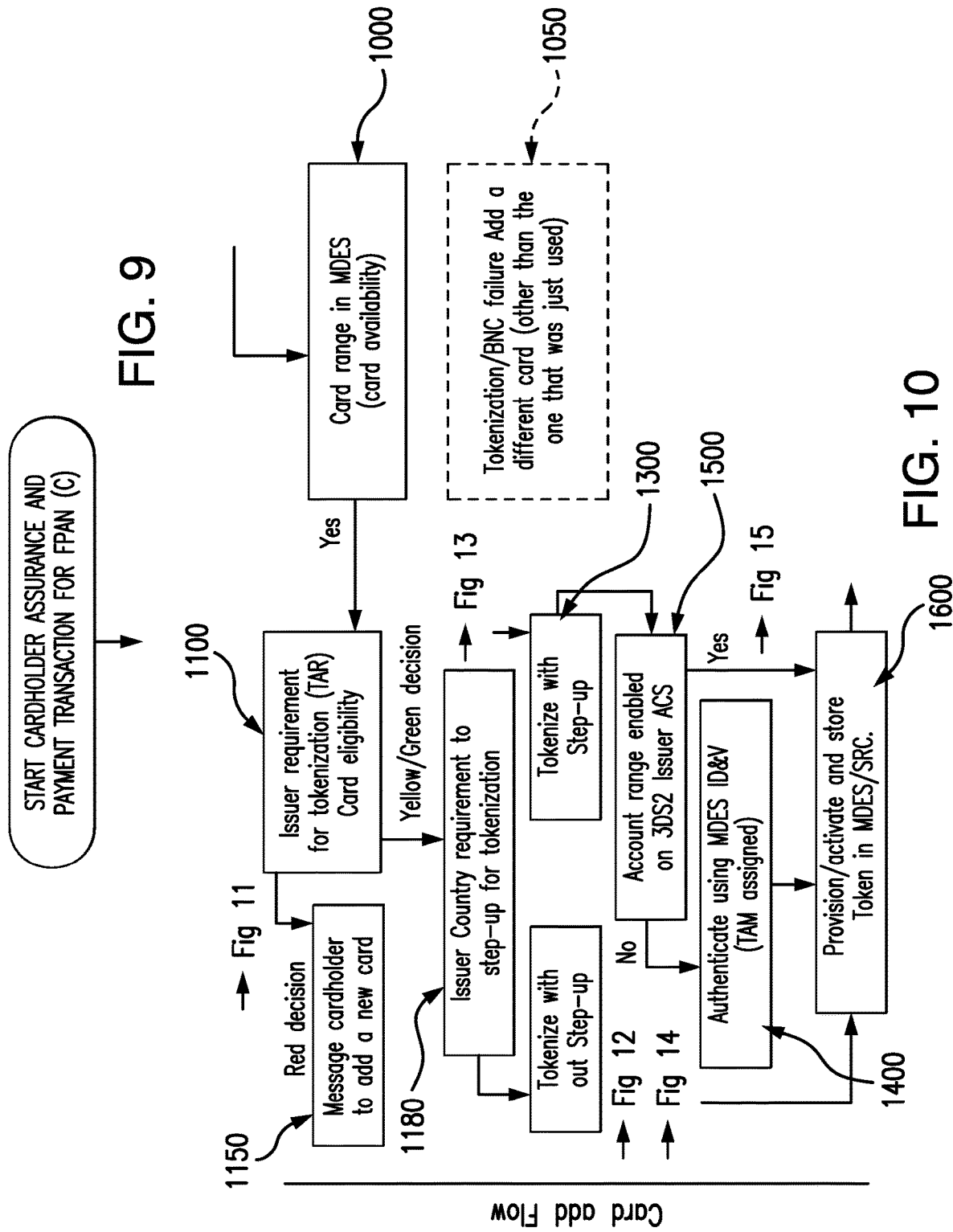

ONLINE AUTHENTICATION

CROSS-REFERENCE TO RELATED APPLICATION

This application claims the benefit of, and priority to, European Patent Application No. 18209328.6 filed on Nov. 29, 2018. The entire disclosure of the above application is incorporated herein by reference.

FIELD

The present disclosure relates to online authentication, and relates in particular to ease of use for consumers in online authentication. For the purposes of this specification, online authentication may be considered to be electronic authentication facilitated by electronic devices connected by a network, the devices being typically physically remote from each other.

BACKGROUND

This section provides background information related to the present disclosure which is not necessarily prior art.

Online authentication is the authentication of a user at their computing device for engagement with an online service or system, typically hosted by a remote server. It is used in a wide variety of contexts to provide security for both service providers and users of a service.

One area in which electronic authentication is particularly important is in financial transactions, particularly those using a payment scheme (transaction scheme) in which a transaction scheme provider provides infrastructure for enabling transactions between a customer and a merchant, each of these parties being supported by their respective bank. The customer will typically use a payment device, such as a payment card.

Payment cards, such as credit cards and debit cards, are very widely used for all forms of financial transactions. The use of payment cards has evolved significantly with technological developments over recent years. Originally, transactions were on paper, using an imprint of a transaction card and confirmed by a signature. This approach was largely replaced by use of a magnetic stripe of a transaction card swiped through a magnetic stripe reader on a point of sale (POS) terminal to perform a transaction. Transaction cards were developed to contain an integrated circuit ("chip cards" or "smart cards") that communicates with a smart card reader in the POS terminal. Cards of this type typically operate under the EMV standard for interoperation of chip cards and associated apparatus (such as POS terminals and ATMs). ISO/IEC 7816 provides a standard for operation of cards of this type. Contactless payments are now possible between suitably enabled payment cards or devices and merchant terminals by short range wireless technology using NFC protocols. Under EMV, these are covered under the ISO/IEC 14443 standard. Payment cards and devices are provided under a transaction scheme (such as MasterCard®, American Express® or Visa®) and the transaction mechanism is mediated by the transaction scheme infrastructure.

EMV specifications relate to contact and contactless payment protocols and are publicly available at the EMVCo website (EMVCo is the industry body tasked with maintaining these specifications with the support of major transaction scheme providers), https://www.emvco.com/document-search/, and would readily be consulted by the person skilled in the art. Terminology relating to EMV technology not expressly defined in this document is referenced and defined in EMV specifications, as will be appreciated by the person skilled in the art.

It is now also possible to use a computing device, such as a consumer mobile device as a proxy for a payment card. Typically this will be a user smartphone running a mobile payment application and with access to user credentials. Mobile phones with a suitable payment application will typically be able to perform contactless transactions with a proximity reader, as well as perform account management operations over an appropriate network interface (cellular, local wireless network) in an online banking interface with the user's account provider. A user may now commonly use his or her mobile phone in obtaining banking services. User authentication processes used for cardholder verification have also been developed. Contact protocols typically used a user PIN to supersede cardholder signatures, but increasingly cardholder biometrics are used for this purpose.

Increasingly, users use their computing devices to perform remote transactions, for example, purchases with online merchants. This is typically a more challenging environment for secure processes, and care needs to be taken not to compromise security for either party. In performing digital transactions using a computing device, an example approach is tokenization. This involves the replacement in the transaction of a card's primary account number (PAN—this number is associated with the cardholder's account with an issuing bank) with an alternate card number, or token. Tokenization is typically used for point-of-sale transactions with mobile devices, in-app purchases or browser based payments. To support tokenization, card details are held in a digital wallet on a cardholder's device (or in a server) supported by a wallet provider. The transaction scheme provides a digital enablement service to support tokens, and tokens are managed by a token service provider. Payment protocols are provided which allow transactions to be performed according to EMV specifications using tokens rather than a card PAN. While other payment technologies for mobile use exist, the present applicant uses for tokenization a payment solution called DSRP (Digital Secure Remote Payment) in support of the Mobile PayPass mobile payment application, with digital enablement in the transaction scheme infrastructure provided by the Mastercard™ Digital Enablement Service (MDES).

While approaches, such as tokenization, provide benefits to customers and merchants by reducing fraud as they allow for the use of EMV supported cryptographic processes, online commerce currently lacks consistency between different payment schemes and requires a relatively high level of user activity to support online payments. It would be desirable to provide greater uniformity, and to reduce the number of situations in which a user is required to provide user credentials (for authorization or otherwise) to reduce the risk that such data could be compromised. EMVCo is currently developing standards for Secure Remote Commerce (SRC) for this end.

There are significant technical challenges in development of such standards, particularly in providing secure processes that do not compromise the user experience. This is particularly difficult when an interaction involves multiple systems, for example, where an online checkout process also requires a payment card to be enrolled for the system. It would be desirable for effective security and an improved user experience to enable such a process to provide an effective and secure interaction with all necessary systems as simply as possible.

SUMMARY

This section provides a general summary of the disclosure, and is not a comprehensive disclosure of its full scope or all of its features. Aspects and embodiments of the disclosure are set out in the accompanying claims.

In a first aspect, the disclosure provides a method of establishing a digital identity for use of an online service and subsequently using the digital identity to perform the online service, the method comprising: partially enrolling the digital identity for the online service by binding the digital identity to computer hardware associated with the digital identity, wherein enrollment of the digital identity is to be completed when a user associated with the digital identity provides a user authentication at the computer hardware associated with the digital identity; and performing a first instance of the online service for the digital identity by using a user authentication process, wherein a user authentication process result completes enrollment of the digital identity and authenticates the digital identity for said first instance of the online service.

This approach is particularly helpful in the case of an online transaction carried out by a consumer seeking both to enroll a payment device to a new platform (such as SRC, the new EMV platform for secure remote commerce) and to make a payment using that payment device.

In embodiments, the online service relates to online payment and the digital identity relates to a payment account. Partially enrolling the digital identity may then further comprise providing payment device details. These payment device details may comprise a Primary Account Number, and may further comprise a card verification code and an expiry date.

In embodiments, this process of enrolling the digital identity further comprises tokenizing an account associated with the digital identity. Partially enrolling the digital identity may then comprise creating a token for the account and binding the token to the digital identity, but not mapping the token to the digital card so that the token can be used in transactions.

This online service may relate to payments according to EMV protocols. The online service may comprise Secure Remote Commerce. The user authentication process comprises 3D Secure (also termed 3-D Secure), which is an additional security layer comprising a messaging protocol that cardholders can use to authenticate themselves with their card issuer when making e-commerce purchases. The current version of 3D Secure, 3D Secure 2.1.0, provides significantly enhanced capabilities, but is not universally adopted.

This aspect may be effectively used where the 3D Secure mechanism (for example, where 3DS2 has been adopted) is such that the cardholder approval using the mechanism provides a sufficient assurance that the token was created in the name of the legitimate cardholder for a genuine card. This achieves a solution which operates seamlessly for the cardholder by providing a "backward trust transfer" from the payment process to the enrollment process.

In a second aspect, the disclosure provides a method of establishing a digital identity for use of an online service and subsequently using the digital identity to perform the online service, the method comprising: binding the digital identity to computer hardware associated with the digital identity, providing a user authentication at the computer hardware associated with the digital identity, enrolling the digital identity for the online service and performing a first instance of the online service for the digital identity by using a user authentication process; wherein the user authentication result is used for both enrollment of the digital identity for the online service and authentication of the digital identity for the first instance of the online service.

This aspect may be used in the same contexts as described above for the first aspect, but may be used to provide a "forward trust transfer" where authentication at card add may be carried over to the payment process. This may be an approach where, for example, 3DS2 is not available.

In a third aspect, the disclosure provides computing apparatus adapted for provision of an online service to clients, the computing apparatus comprising one or more processors and one or more memories, wherein the computing apparatus is programmed to perform the following functions: enroll a digital identity for the online service, where the digital identity is bound to computer hardware associated with the digital identity; and perform a first instance of the online service for the digital identity; wherein a user authentication result has been obtained at the computer hardware associated with the digital identity, and the same user authentication result is used for both enrollment of the digital identity for the online service and performance of a first instance of the online service for the digital identity.

In a fourth aspect, the disclosure provides a computer hardware device comprising one or more processors and one or more memories, wherein the computer hardware device is adapted to: bind a digital identity to the computer hardware device; authenticate a user, and provide a user authentication result to an online service for enrollment of the digital identity for the online service and performance of a first instance of the online service; wherein the user authentication result is used for both enrollment of the digital identity for the online service and for performance of the first instance of the online service for the digital identity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In connection therewith, embodiments of the disclosure will now be described, by way of example, with reference to the accompanying figures, of which:

FIGS. 7 to 9 show a first detailed embodiment of the process of FIG. 5; and FIG. 10 shows an alternative flow for part of the process of FIG. 5;

Figure 17:
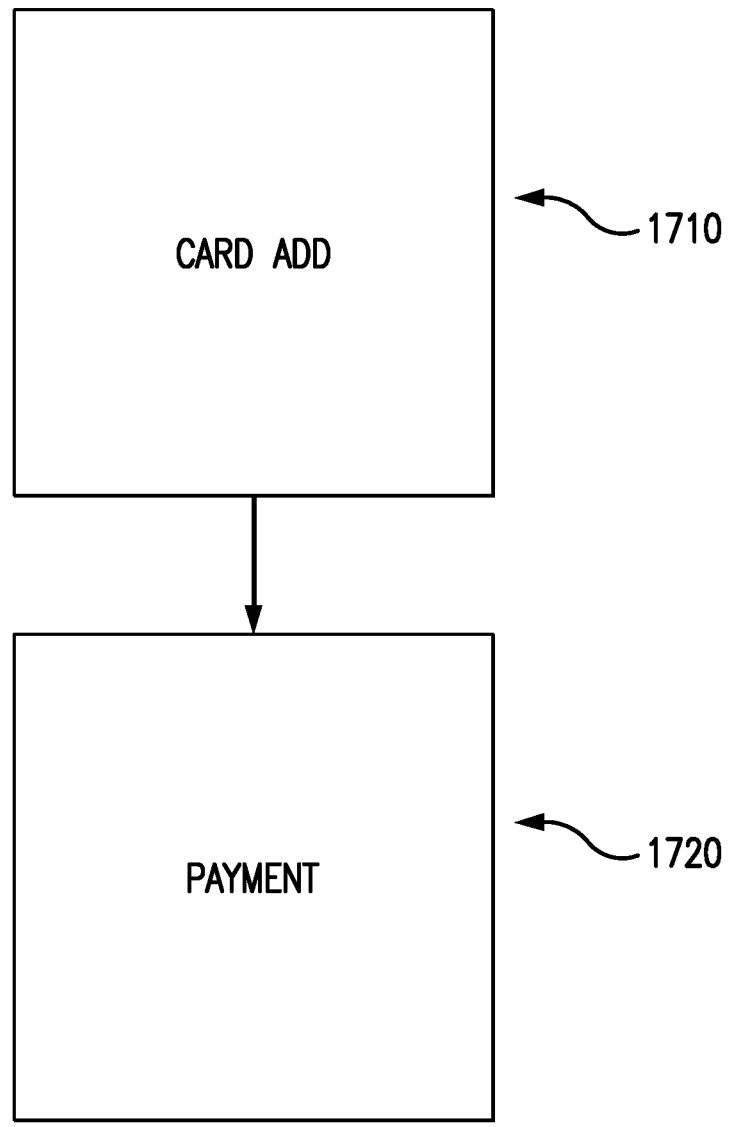
Figure 18:
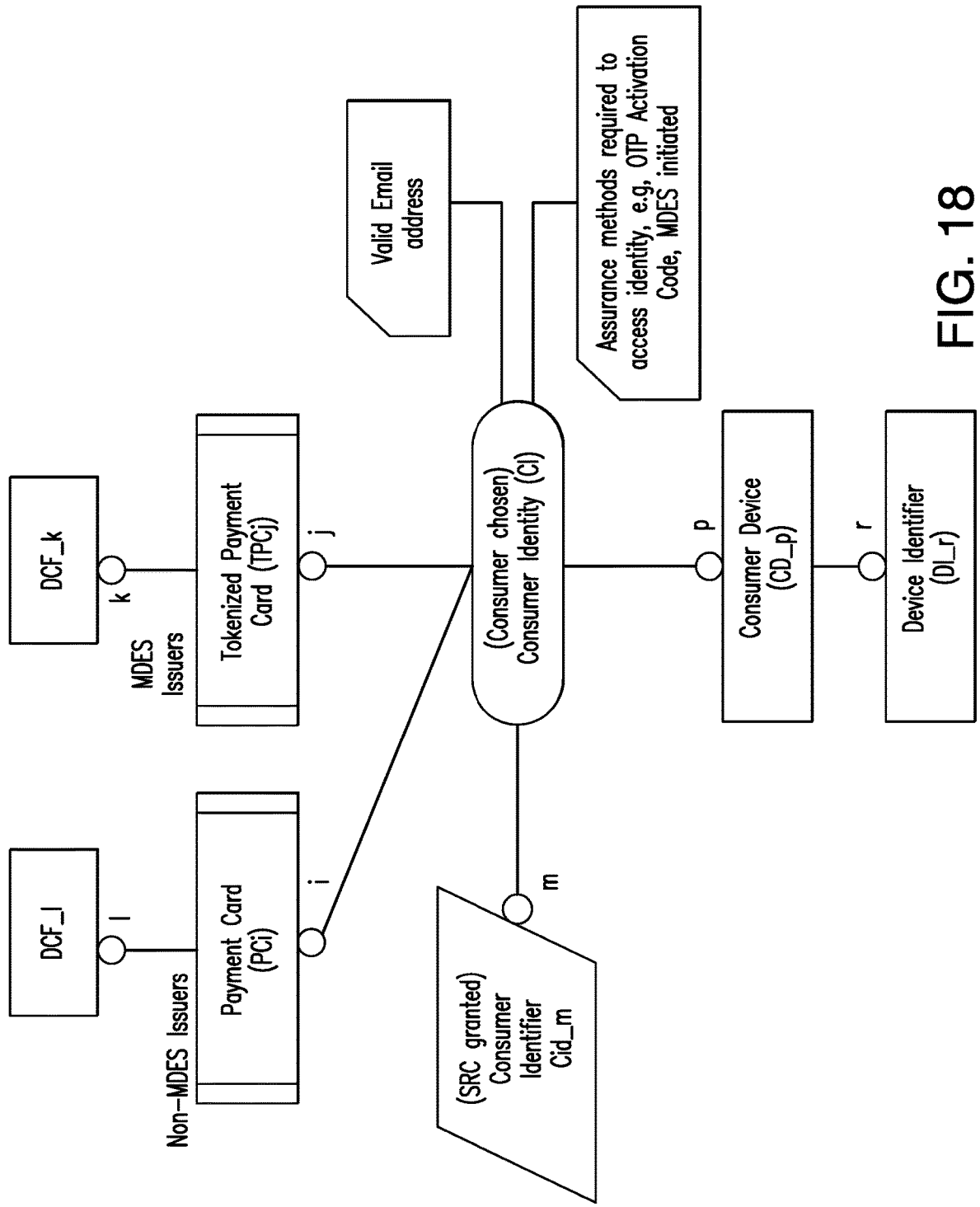
Figure 19A:
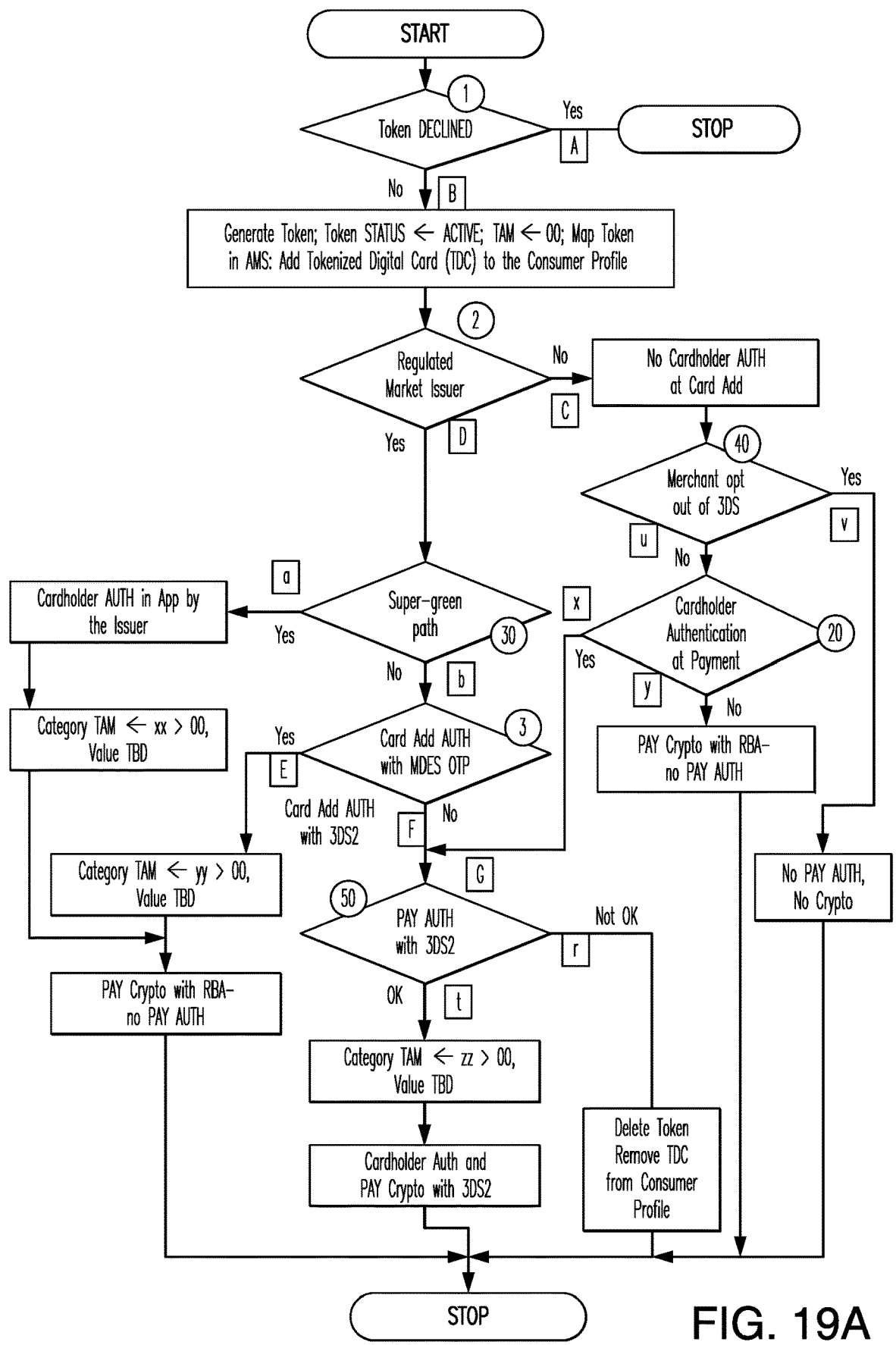

FIG. 17 indicates the design principles used in embodiments of the disclosure in general terms;

FIG. 18 illustrates a general approach taken to construction of a Consumer Profile in an SRC platform; and FIG. 19A shows in more detail the process flow of FIG. 10 followed by payment, with FIGS. 19B to 19G show various working modes of the process flow of FIG. 10 as further illustrated in FIGS. 11 to 15.

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure. That said, general and specific embodiments of the disclosure will be described below with reference to the figures. While embodiments of the disclosure may be employed in other online authentication contexts, a context of particular interest is that of online transactions made using a transaction scheme (also termed a payment scheme). Such transactions are made using a payment network, the payment network provider enabling transactions between a customer and a merchant supported by their respective banks.

Figure 1:
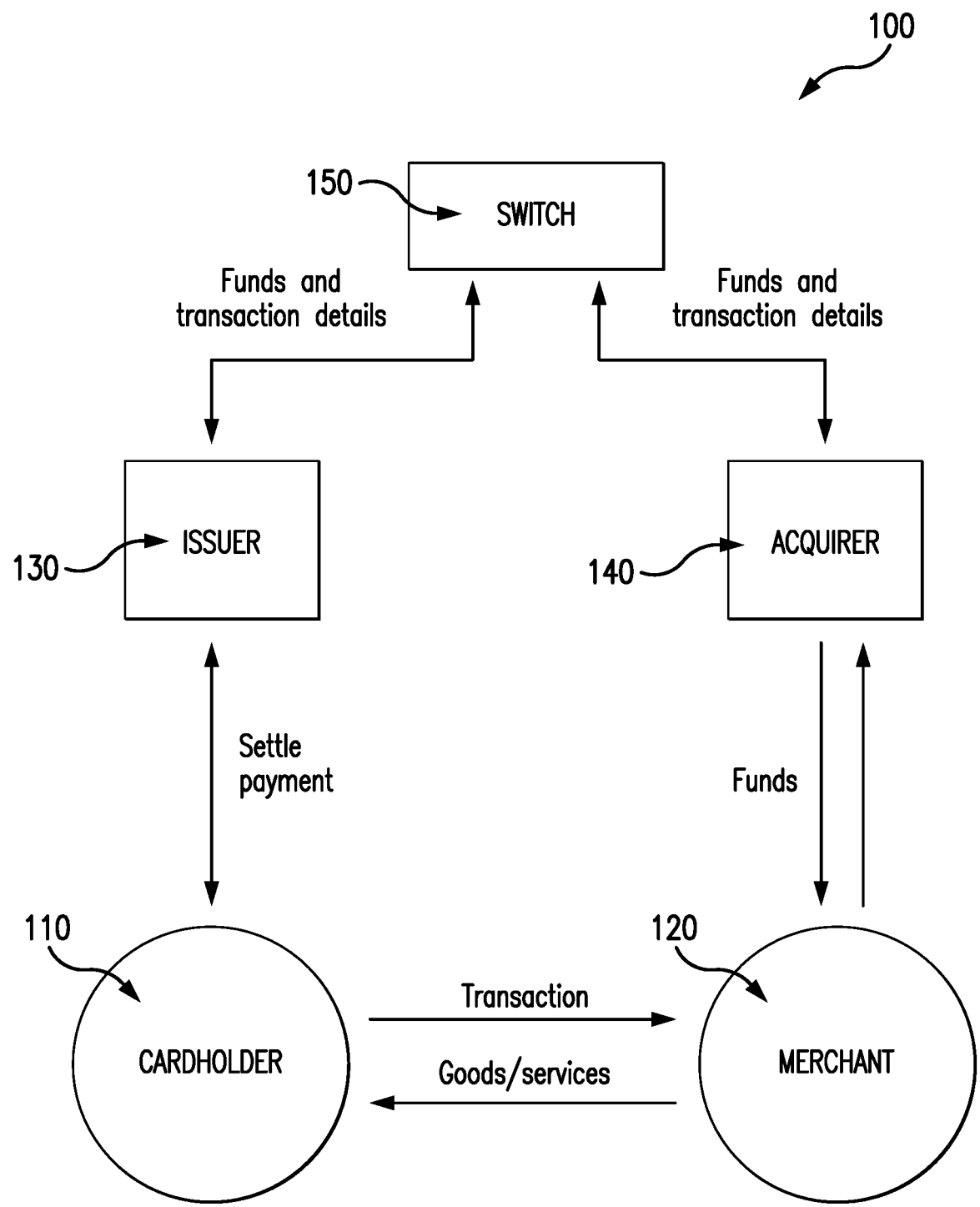
FIG. 1 shows schematically a transaction system using the four-party model.

FIG. 1 is a block diagram of a typical four-party model or four-party payment transaction scheme 100. The diagram illustrates the entities present in the model and the interactions occurring between entities operating in a card scheme.

Normally, card schemes, such as payment networks linked to payment cards, are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank, or any other financial institution that issued the card to the cardholder 110. The acquirer 140 provides services for card processing to the merchant 120.

The model also comprises a central switch 150. Interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorization and settlement. The cardholder 110 initiates a purchase of a good or service from the merchant 120 using their card. Details of the card and the transaction are sent to the issuer 130 via the acquirer 140 and the switch 150 to authorize the transaction. Should the transaction be considered a higher risk by the issuer 130, the cardholder 110 may be required to undergo an additional verification process to verify their identity and the details of the transaction. Once the additional verification process is complete the transaction is authorized.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices, such as a smart phone.

Figure 2:
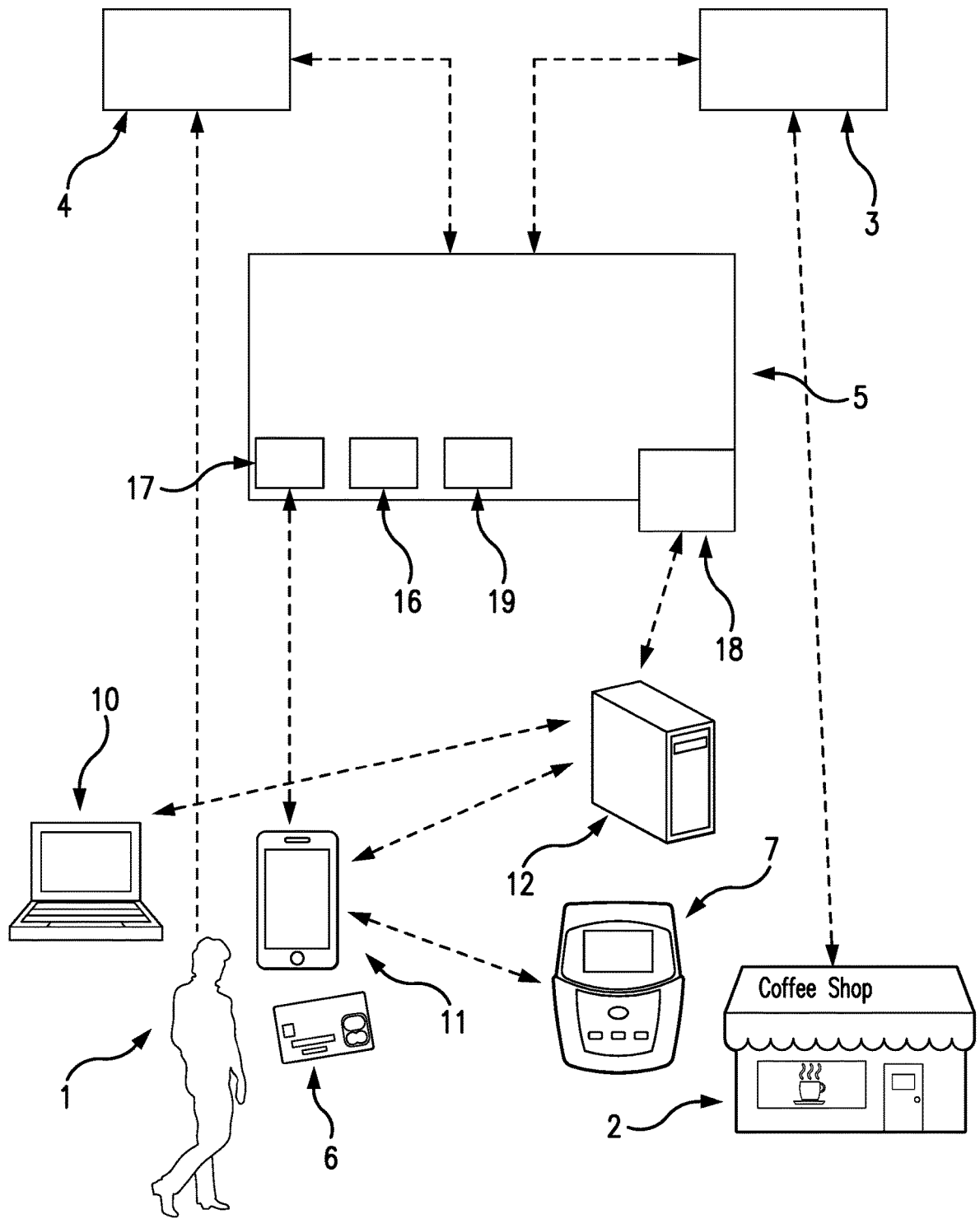
FIG. 2 shows an implementation of the transaction system of FIG. 1 adapted for performing embodiments of the disclosure.

FIG. 2 shows an architecture according to an embodiment of the disclosure appropriate for interaction between a cardholder and a merchant, illustrating specifically how this is adapted to support an online transaction between a consumer device (such as, a computing device used by a consumer to conduct online transactions) and a merchant server.

In general, the cardholder 1 uses their computing device, which may be any or all of a cellular telephone handset, a tablet, a laptop, a static personal computer or any other suitable computing device (here a cellular telephone handset or smartphone 11 is shown) to act either as a proxy for a physical payment card 6 or as a virtual payment card operating only in a digital domain. The smartphone 11 achieves this with a mobile payment application and a digital wallet, as described below. The smart phone 11 is thus able to transact with a merchant POS terminal 7 using NFC or another contactless technology. However, online transactions are of particular interest in connection with embodiments of the disclosure, rather than contact or contactless transactions with a merchant POS terminal 7. To make an online transaction, the smartphone 11 may also be able to interact with a merchant server 12 representing the merchant 2 over any appropriate network connection, such as the public internet. An alternative computing device, such as a laptop computer 10, is also shown, interacting with the merchant server 12 over the public internet. Any other suitable computing device (such as a personal computer) may be used by the cardholder 1 to carry out an online transaction in this way.

The transaction scheme infrastructure (transaction infrastructure) 5 here provides not only the computing infrastructure necessary to operate the card scheme and provide routing of transactions and other messaging to parties, such as the acquirer 3 and the issuer 4, but also a wallet service 17 to support a digital wallet on the cardholder computing device, and an internet gateway 18 to accept internet based transactions for processing by the transaction infrastructure. In other embodiments, the wallet service 17 may be provided similarly by a third party with an appropriate trust relationship with the transaction scheme provider. To support tokenization, a token service provider 19 is present (again, this is shown as part of transaction infrastructure 5 but may be provided by a third party with appropriate trust relationships), and the transaction scheme infrastructure provides a digital enablement service 16 to support the performance of tokenized digital transactions, and to interact with other elements of the system to allow transactions to be performed correctly.

For a tokenized transaction, the transaction is validated in the transaction scheme by mapping the cardholder token to their card PAN, checking the status of the token (to ensure that it is in date and otherwise valid) and any customer verification approach used. This allows the issuer to authorize the transaction in the normal manner.

Figure 3:
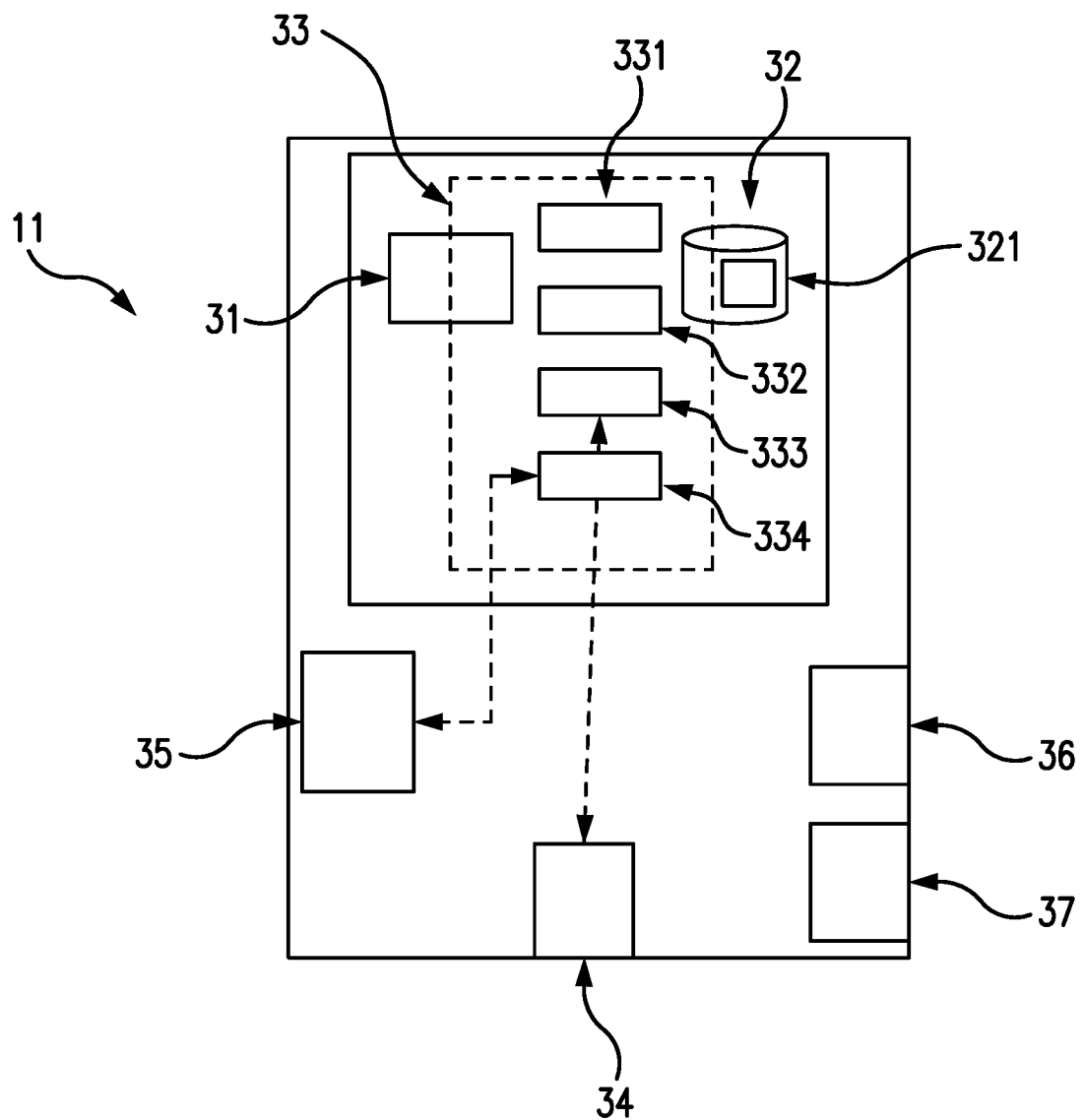
FIG. 3 shows functional elements of a user computing device for use in the transaction system implementation of FIG. 2.

FIG. 3 illustrates schematically by function a user computing device. Other elements of the architecture of FIG. 2 are either not modified in embodiments of the disclosure, or are organized in an essentially conventional manner, for example, merchant server 12, which may be implemented by an industry standard server programmed to have a conventional server/client relationship with clients, such as a merchant application on a user's smartphone. Similarly, the elements shown explicitly within the transaction scheme, which may be carried out by suitably programmed servers associated with the transaction scheme. Generally, the transaction scheme infrastructure 5 comprises servers, network communications and switches to allow transactions to be correctly routed and processed.

FIG. 3 shows a user computing device, in this case a smartphone 11. The smartphone possesses at least one processor 31 and at least one memory 32, between them defining a computing environment 33 for performance of applications. Applications running in the computing environment include a wallet application 331, a merchant application 332 and a browser 333, which are described in further detail below. Other elements may be present, such as a biometric application 334, which may be used to authenticate the user 1 of the smartphone 11 before an action is taken. The memory 32 may contain one or more physically or logically protected regions 321 for protection of sensitive data required by these applications. Such secure environments may be implemented in a variety of ways (as the skilled person will appreciate) and are not shown explicitly here, but access to secure data handling will typically be required by both a wallet application and a biometric application. The smartphone 11 is of course adapted for cellular communication (and generally also short range wireless communication) and has a wireless communication system 34. The smartphone 11 also here has a biometric sensor, in this case fingerprint reader 35. Other conventional elements of a smartphone device, such as a touchscreen user interface 36 and a camera 37, are present, but where their operation is conventional they are not described explicitly here.

Figure 4:
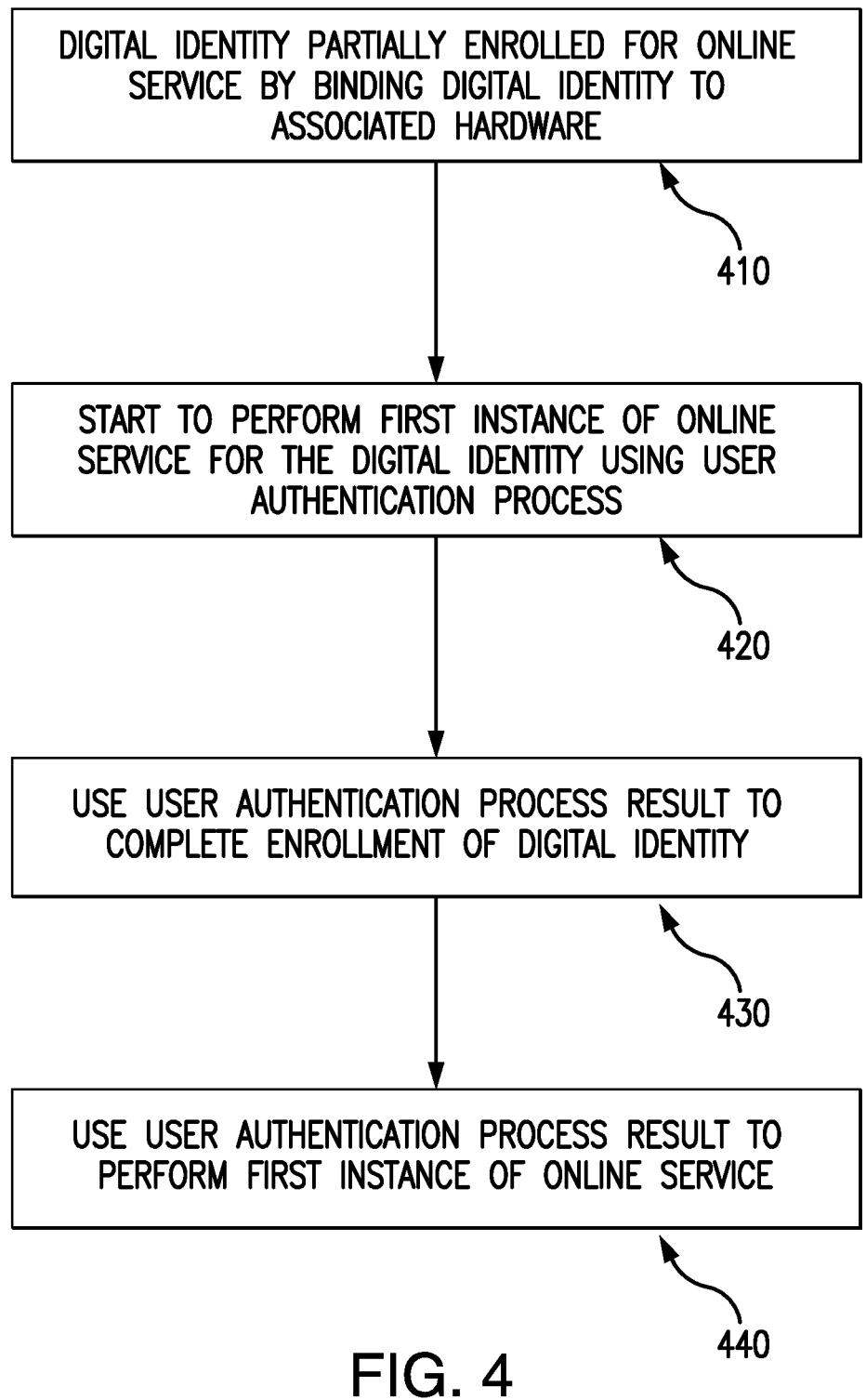
FIG. 4 shows a process according to a general embodiment of the disclosure.

A process according to a general embodiment of the disclosure is shown in FIG. 4. This process enrolls a digital identity for use of an online service and subsequently uses the digital identity to perform the online service.

Firstly, the digital identity is partially enrolled 410 for the online service by binding the digital identity to computer hardware associated with the digital identity. Enrollment is not complete at this point, and it will not be completed until the user associated with the digital identity provides a user authentication. This is to be carried out at the computer hardware associated with the user identity.

When performing 420 a first instance of the online service for the digital identity, this user authentication process takes place, and the user authentication process result is used both to complete enrollment of the digital identity 430 and to authenticate the digital identity for performing 440 said first instance of the online service.

Embodiments of the disclosure will now be described in more detail in relation to transactions using Secure Remote Commerce (SRC). EMVCo has developed and is further developing other standards directly relevant to this area: Payment Token Standard (PTS) for standardization of tokenization; and 3-D Secure for provision of an additional security layer for online transactions (exemplified as Mastercard™ Secure Code and Verified by Visa® by Mastercard™ and Visa™ respectively). Specifications for all these three areas are provided at https://www.emvco.com/document-search/, and the skilled person is directed to these documents for specific technical details needed for implementation of these standards. Versions of SRC, PTS and 3D Secure current at the time of drafting this application are discussed here, though these standards and protocols are currently evolving. The skilled person will appreciate that the principles of this disclosure will continue to apply to these standards and protocols as they evolve, and that embodiments of the disclosure may be provided accordingly.

The implementation described here is described in terms of Mastercard™ digital enablement solutions, though the skilled person will understand that the principles of the disclosure are equally applicable to other transaction schemes. References therefore may be made below to Mastercard™ proprietary protocols such as Digital Secure Remote Payment (DSRP), and implementations of elements of protocols, such as Accountholder Authentication Value (AAV), for generation of a Universal Cardholder Authentication Field (UCAF) used in the 3D Secure process, but the skilled person will understand that these could as easily be applied to similar protocols and implementations used with other transaction schemes when addressing the same issues.

To use SRC, it is necessary for payment cards to be enrolled to SRC, and for transactions to be carried out using an SRC checkout. Cardholder authentication is required for enrollment, and used for subsequent payment card tokenization, and is also used for SRC checkout. In most use cases, cardholder authentication is required for one process at a time, and will be taking place at a time when the cardholder can reasonably be expected to make an authentication action. These are not considered to be problematic. The problematic use case is when a payment card needs to be enrolled at the time an SRC checkout is made. These separate processes both require cardholder authentication, and conventional processes would require the cardholder to authenticate repeatedly, which is both inefficient and inconvenient for the cardholder The embodiment below describes an approach to enable a common authentication process to be used for both the enrollment process and the SRC checkout process. The enrollment process and SRC checkout process will only be described here in the detail necessary to illustrate how they are adapted to use this common authentication process. Aspects of these processes that are not related to cardholder authentication are not relevant to the present disclosure and the skilled person is directed to the relevant EMVCo standards for consideration of these aspects.

FIG. 17 indicates the design principles used in general terms. The overall process may be considered as one of Card Add 1710 followed by Payment 1720. In one approach, if there is a cardholder authentication step in the Card Add process, there will not need to be a cardholder authentication step in the Payment process. Trust is carried over from Card Add 1710 to Payment 1720 (this could be considered a "forward trust transfer"). In this case, Payment will be associated with 3D Secure risk-based authentication (RBA) and the cryptogram that is produced in the payment process will be effective to achieve a merchant liability shift.

Risk-based Authentication (RBA) is a process used for cardholder authentication in e-commerce which involves risk assessment for a specific transaction in real time that is based on the history of the most (n) recent transactions performed with that payment instrument. Users are typically provided with authentication options appropriate to the risk level. Transaction data, cardholder data, device data and merchant data may all be used for this purpose, with transaction velocities measured and an assessment made in accordance with an underlying data model.

There is however another approach available, which is that cardholder authentication does not happen at Card Add, but happens instead at Payment. This provides customer security, and allows (in contrast to the first approach) a "backward trust transfer" for the enrollment process. Cardholder Authentication for payment may now take place by a 3D Secure challenge process, allowing liability shift as well as a cardholder authentication that may be used for enrollment.

The general approach taken to construction of a consumer profile in a SRC platform is illustrated in FIG. 18. It is important for this to be constructed in a secure fashion here, by adding tokenized digital cards to a consumer identity through trusted authentication methods. If this were not done, there would be a risk of an attacker constructing such a container using lost or stolen cards. This would render the system unsafe and would deter consumer confidence.

FIG. 18 shows a data model tree for a consumer profile. A path in the tree is unique, and is identified with a Consumer Identifier (Cid_m) assigned by the SRC system. For example, the following would represent two different Consumer Identifiers:

Cid_m(1)={CI, TPC_j(1)=Tokenised Digital Mastercard_A(1),
DCF_k(1)=Android Pay, CD_p(1)=Laptop,
DI_r(1)[CD_p(1)]=Cookie(Chrome) on Laptop}, and where
TCP_i(1)=Token 1 [PAN, CD_p(1), DI_r(1)[CD_p(1)], with PAN in Issuer_A account range
Cid_m(2)={CI, TPC_j(2)=Tokenised Digital Mastercard_A(2),
DCF_k(1)=Android Pay, CD_p(1)=Laptop,
DI_r(2)=Cookie(InternetExplorer) on Laptop}, and where
TCP_i(2)=Token 2 [PAN, CD_p(1), DI_r(2)[CD_p(1)], with PAN in Issuer_A account range These are two tokenized cards—TPC_j(1) and TPC_j(2)—with the same PAN, but each has a different token account number because they were created through different "device" routes, in this case from a Chrome browser and an Internet Explorer browser respectively (though from the same laptop). The tokenization service provider (such as MDES, the Mastercard™ Digital Enablement Service) when generating the token needs to know the Consumer Device and Device Identifier combination associated with the Consumer Identity, as these are all needed when generating the token.

The Consumer Identity (CI) provides a unique root for the consumer in the SRC system. This is an identity chosen by the consumer/cardholder when registering for SRC. Typically it will be a cardholder e-mail address. The CI will comprise this e-mail address with a linked PSD2 authentication method (PSD2 is the current EU Payment Services Directive), such as a one-time password with activation code, initiated and verified by the tokenization service provider (MDES uses this approach).

For the tokenized digital payment card, the populating of the consumer profile (the growth of the tree shown in FIG. 18) is possible if the CI is already linked to a specific Consumer Device and Device Identifier combination (e.g. Laptop, Cookie(Chrome)). This first branch of the tree should be created before linking the tokenized payment card (such as TPC_j(1)) through to a Digital Card Facilitator (DCF) application (such as DCF_k(1)), and preferably outside a payment experience altogether to avoid a time consuming and complex payment experience. The first branch here for Cid_m(0) would begin with {CI, CD_p(1)=Laptop, DI_r(1)[CD_p(1)]=Cookie(Chrome) on Laptop}.

This initial branch Cid_m(0) could be linked for j tokenized digital payment cards, distributed over DCF applications according to cardholder preference and computing device setup (such as what apps and browsers are installed). For example, a cardholder could elect to use Android Pay as a payment application when using a Chrome browser, but could also choose another Chrome compatible provider.

In summary, a tokenized payment card cannot be added during payment to a consumer profile unless a Consumer Identity/Consumer Device/Device Identifier combination has been established.

Figure 5:
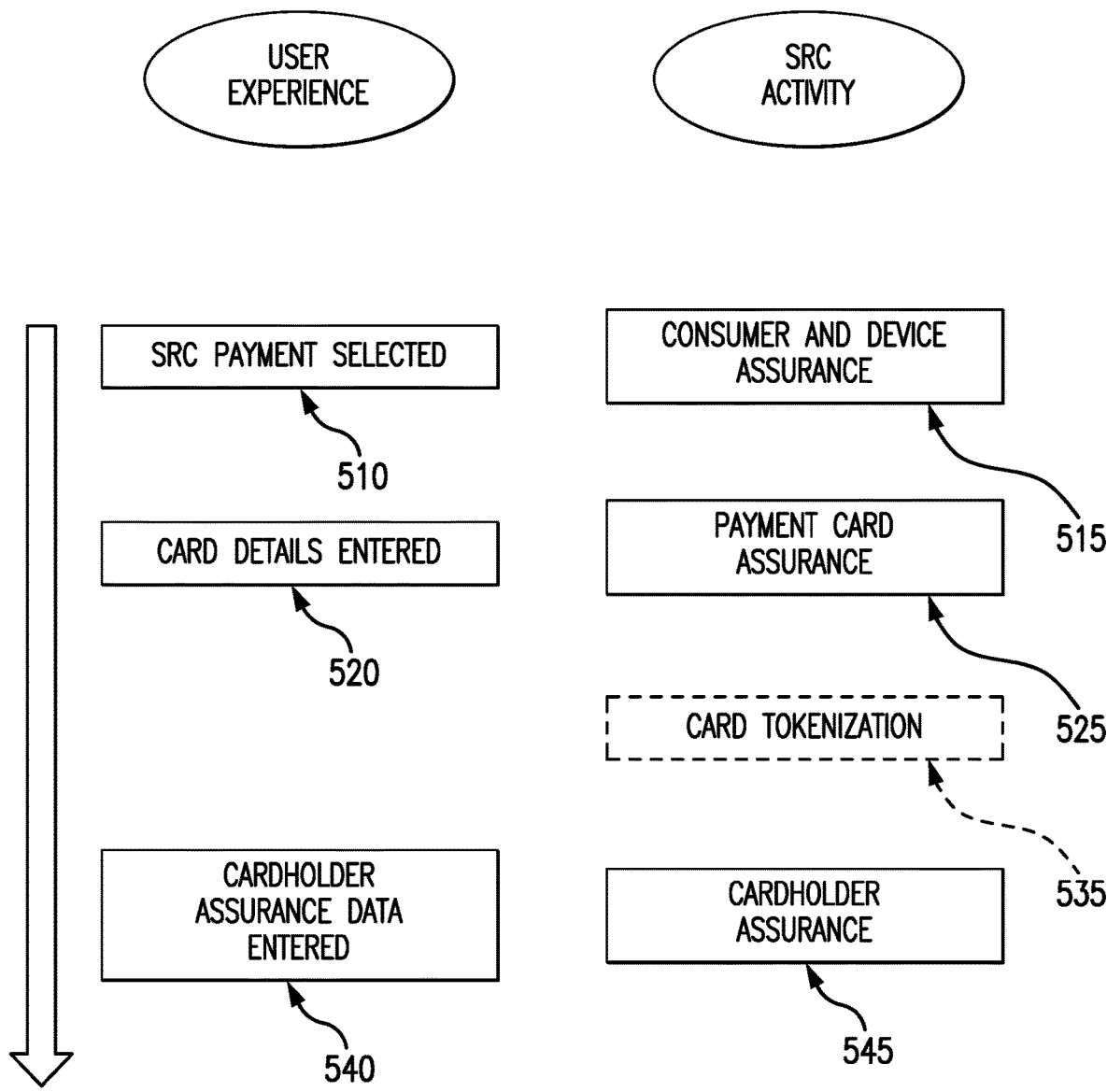
FIG. 5 shows application of the process of FIG. 4 to enrollment and use of a payment card for Secure Remote Commerce.

A general process description for an SRC Checkout with Payment Card Enrollment according to an embodiment of the disclosure is provided in FIG. 5. This process will be followed during an online commerce transaction between a user (cardholder) using his or her computing device to make a payment using a payment card, where the user is also making an enrollment for SRC. The user experience (UX) at the website is described in one column. This shows relevant data served to the user, and data entered by the user, associated with the process. The steps involved in SRC enrollment and payment (SRC activity) are shown in a separate column.

Initially, the user will select 510 SRC payment at the merchant website as part of their transaction process (the remainder of the transaction process may be conventional and is outside the scope of this disclosure). This initiates consumer and device assurance 515 to begin SRC enrollment. The user is identified by e-mail address and the device by an appropriate device fingerprint. After this stage, the consumer device is bound with the user e-mail address.

The user is then invited 520 to enter details of a card for SRC enrollment and purchase. This enables a payment card assurance 525 process to be carried out, where it can be determined that the account is in good standing and is associated with the user. If this succeeds, then the card, considered at this point as a digital card, is bound with the e-mail address. The digital card, however, is not usable at this point. If this step fails, the process stops and the card cannot be used for SRC.

After this, Card Tokenization takes place 535. This does not involve any user interface activity, and may not be required in all embodiments. This involves the issuer (or a proxy for the issuer) determining whether tokenization is allowed for the identified card. If it is, then a token is bound with the digital card. However, the token is not mapped to the card in the vault used for determining whether a tokenized transaction can take place. The enrollment process is thus not complete at this point. The enrollment process is ready to be completed, but requires user authentication.

This user authentication, in the form of Cardholder Assurance Data 540, takes place next and is used both for completing the enrollment process and for the transaction. It will normally take place through a 3-D Secure process flow (3DS2 in the arrangement shown here). The SRC enrollment and payment process continues 545 and if successful maps the token to the digital card in the vault and sets the digital card to be usable, thereby completing the enrollment, and creates an authenticated Accountholder Authentication Value (AAV), which is the present applicant's approach to generating the UCAF (Universal Cardholder Authentication Field) used in the 3-D Secure process for the transaction.

Figure 6:
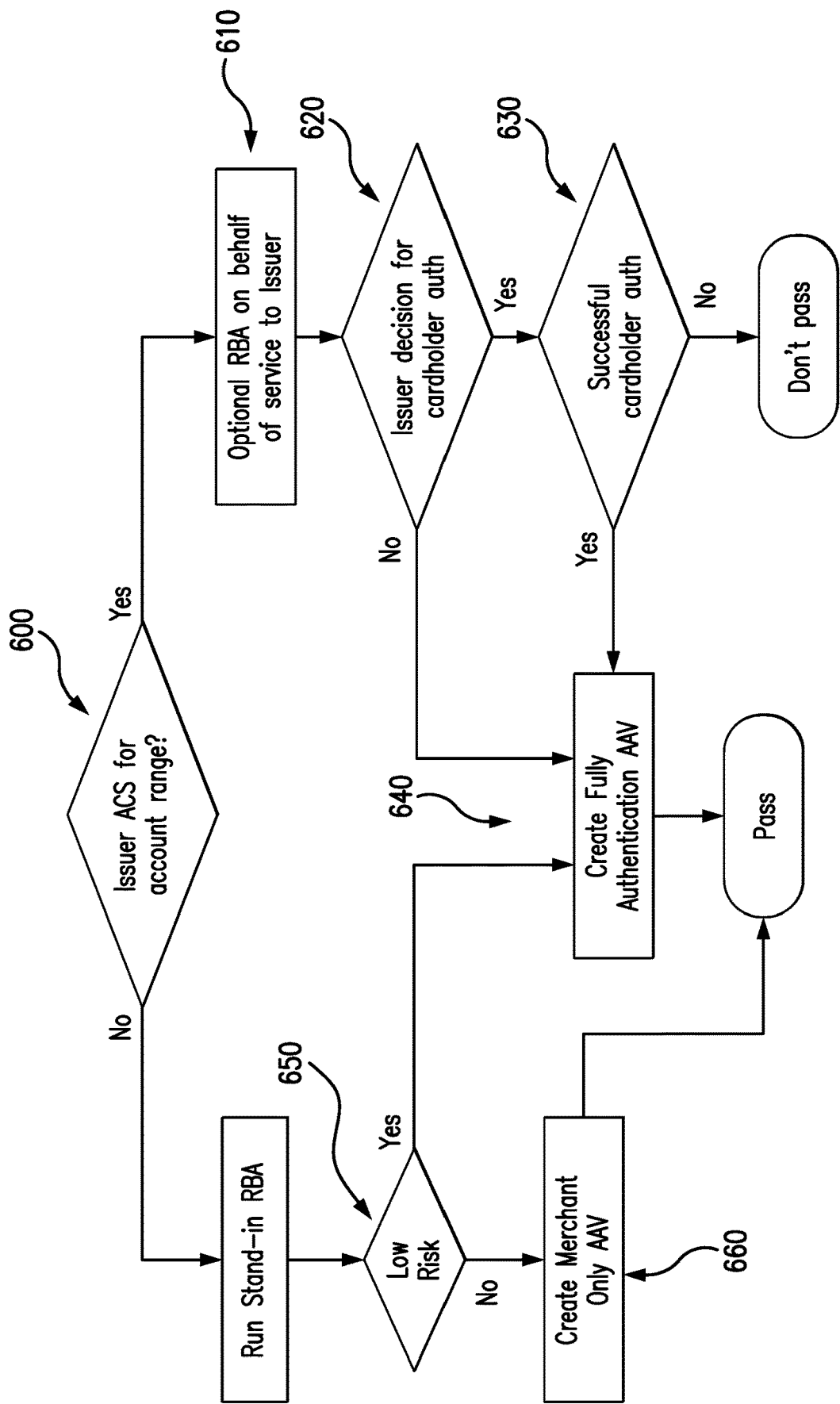
FIG. 6 is a flow diagram indicating how 3D Secure can be used to obtain an Accountholder Authentication Value (AAV) in the context of FIG. 5.

Use of 3D Secure to provide an AAV in this way is shown in FIG. 6. The first step is to determine 600 where the issuer has an Access Control Server (ACS) configured to make an assessment for the relevant account. If yes, then this issuer ACS follows the following process. There may be an initial Risk Based Authentication (RBA) process carried out 610 on behalf of the issuer. It will then be determined whether it is necessary 620 for an issuer decision to be made for cardholder authentication. If not, then a fully authenticated AAV may be created 640, but if so, then the cardholder authentication step 630 follows. If this is not passed, then the process fails, but if it is passed, then a fully authenticated AAV is again created 640. An alternative process is followed if there is no appropriately configured issuer ACS. In this case, a stand-in Risk Based Authentication process is run 650 to determine whether the transaction is higher or lower risk. If it is lower risk, then a fully authenticated AAV is created 640 as before. If it is higher risk, there is still acceptance, but the risk is mitigated by making the AAV merchant specific 660.

In the SRC process, assurance may be required for different actors in the system, with different methods used to provide it. SRC requirements are set out in Table 1 below.

For the consumer making the transaction, the requirement is that permission has been granted to access the payment data. This may not be required in some contexts (for example, after an analysis that the context is low risk), but often may involve a second factor over a separate channel.

For the consumer device, the assurance requirement is similar but specific to the consumer device. Again this is not needed in every context, but if it is then a Consumer Device Cardholder Verification Method (CDCVM) will typically be used.

Figure 7:
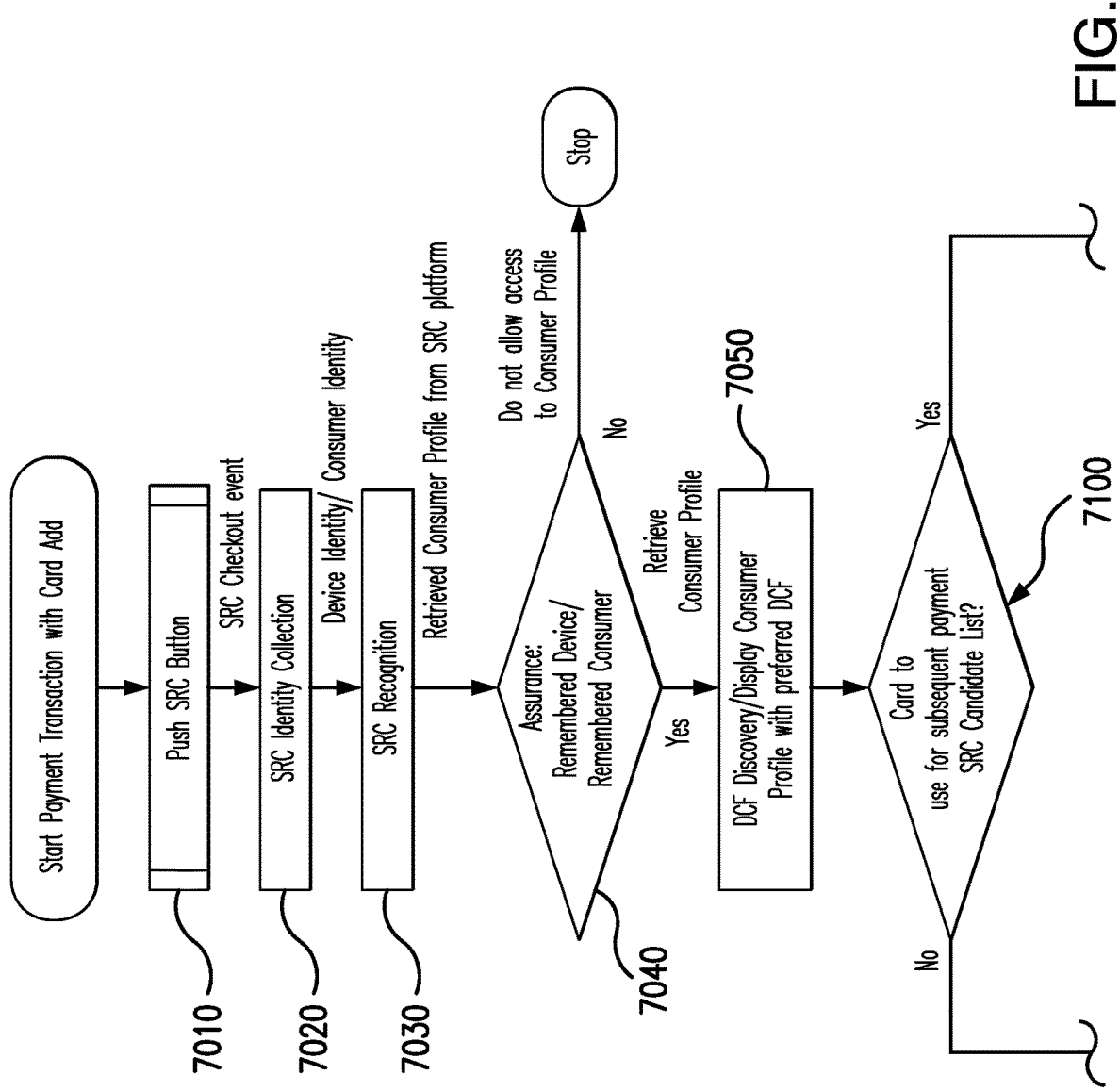
Figure 8:
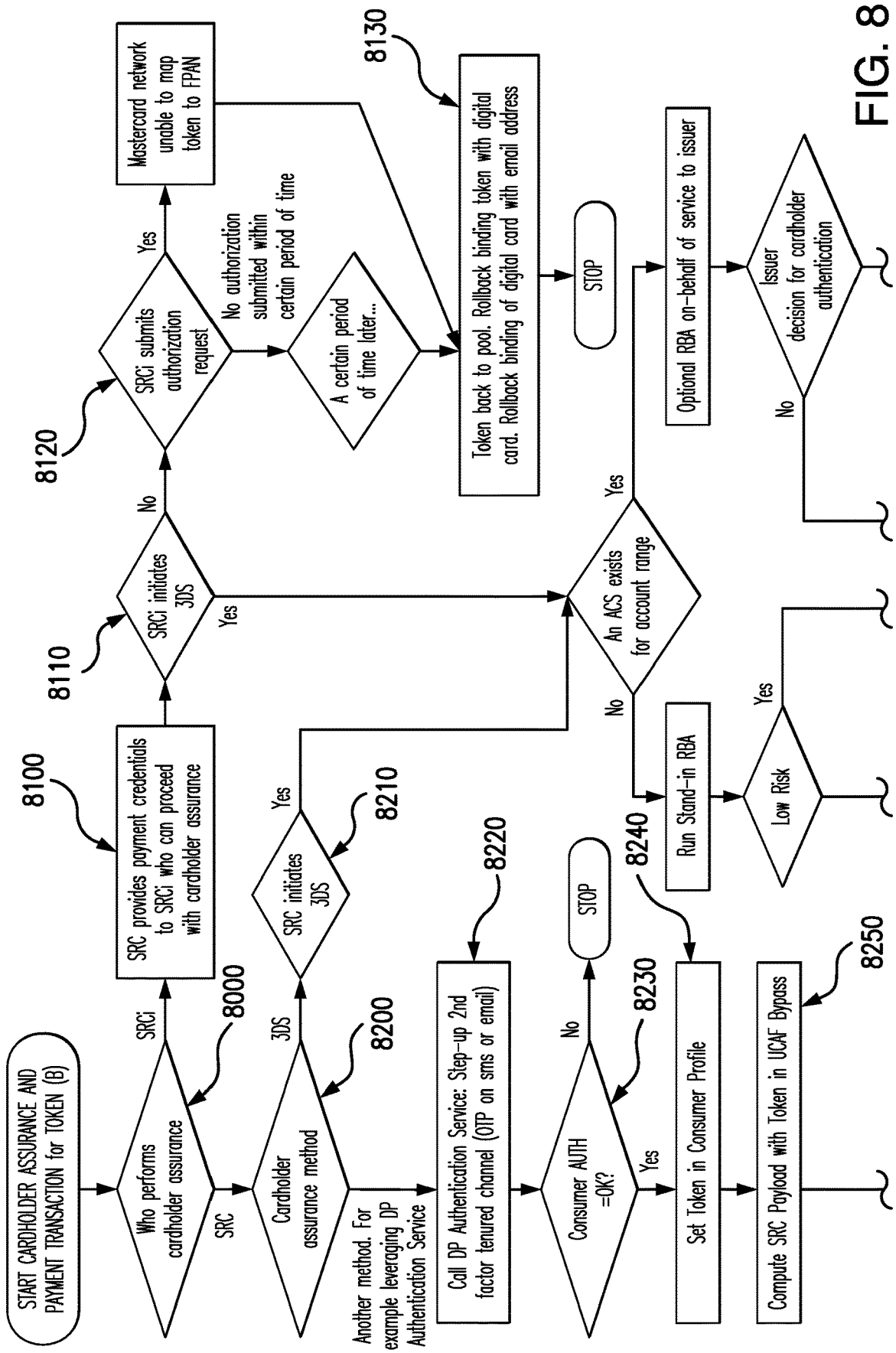
Figure 8:
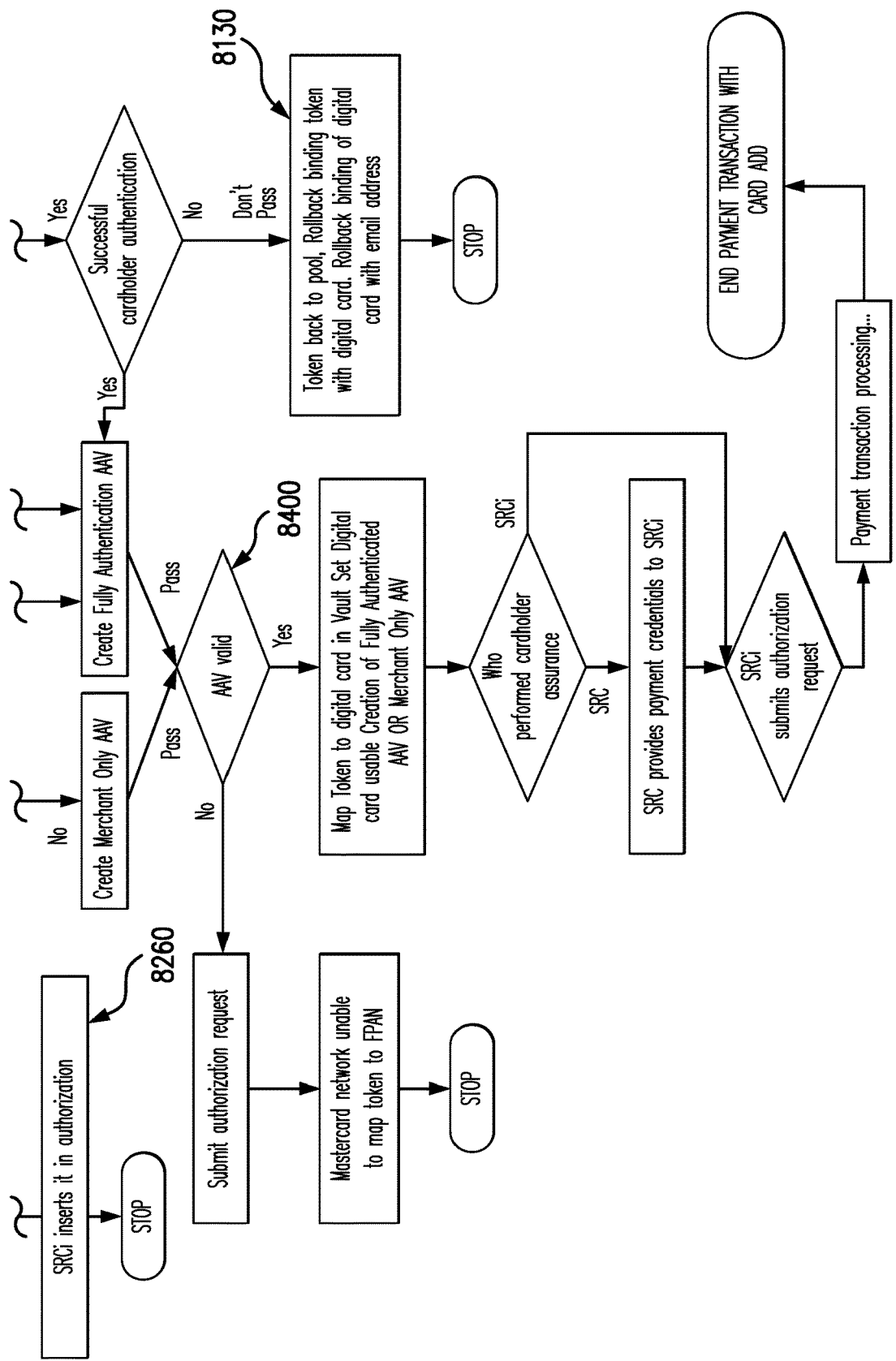

More detailed process flows for this embodiment are shown in FIGS. 7 to 9. FIG. 7 breaks down the initial stages of the process including bindings and tokenization, but not including the cardholder assurance and payment transaction for a tokenized transaction (shown in FIG. 8) or a non-tokenized transaction (discussed with reference to FIG. 9).

FIG. 7 indicates the initial stages of a detailed process flow for the process of FIG. 5. Selection of SRC Checkout (7010) determines an SRC Checkout Event that triggers the SRC Identity Collection (7020). This stage provides the Device Identity and Consumer Identity as stored by the SRC System, which is further used by the SRC Recognition (7030) process to retrieve the Consumer Profile from the SRC System. If the provided identifiers correspond to a remembered device/consumer (7040) then, following this low assurance verification, the Consumer is provided with access to its Consumer Profile. This is visualized with the preferred Digital Card Facilitator among those DCFs (7050) with which the Consumer Profile has registered its Digital Cards till now. SRC checkout begins with a determination 7100 of whether or not the card is in the SRC Candidate List (i.e., that the card is already enrolled in SRC). If so, the SRC process provides 7110 payment credentials to SRCi and

TABLE 1

SRC assurance requirements and methods

| Type of Assurance | What | Methods |
|---|---|---|
| Card | Assurance that PAN is valid and in good standing (not listed as lost/stolen, closed or unissued) | Account Verification<br>Account Verification with card security code<br>Issuer Provided |
| Cardholder | Assurance that the Issuer performed authentication of the Cardholder using tenured information | 3DS Payment Authentication<br>3DS Non Payment Authentication<br>Other Issuer ID&V Method |
| Consumer | Assurance that the Consumer has granted permission to access the Payment Data identified by the Consumer Identifier | Not Performed<br>Biometric<br>Step up or $2^{nd}$ factor via a tenured channel (one known to be associated with the Consumer)<br>Step up or $2^{nd}$ factor via an untenured channel<br>Risk based |
| Consumer Device | Assurance that the Consumer through their Consumer Device is associated and has granted permission to access the Payment Data through the Consumer Identifier | Not Performed<br>CDCVM, such as<br>Risk based (staying signed in)<br>Biometric<br>Passcode/password |

For the card, the assurance required is that the associated account is valid and in good standing. This information will generally be provided for or on behalf of the issuer. Usually this will be by a defined account verification process.

For the cardholder, the assurance required is that the issuer has authenticated the cardholder. This here will typically be by a 3-D Secure process, though there is also the possibility of an alternative issuer Identity and Verification (ID&V) approach.

SRCi proceeds with authorization (this process being outside the scope of the present disclosure). The SRCi (SRC Initiator) is an element defined to securely manage checkout and Payment Data received from the SRC system. It will typically be exemplified as a PSP connected to Merchants/DSA (Digital Shopping Applications) on side and on the other side being connected to the SRC system. Typically, SRCi will attempt to look up in the SRC system for the Consumer Profile and return customer profile information (i.e., which cards I have digitized up to now) associated to a specified and authorized app instance identifier, consumer identifier, or client identifier.

If the card used for payment is determined 7100 not to be in the SRC Candidate list, that is, the card needs to be added in order for SRC Checkout to be available, then the process of the present disclosure applies. On making this determination, card details are enrolled 520 for SRC. The card details provided are those needed for an online transaction (PAN, but also CVC2 and expiry date) and will typically be entered by the user in the same way as for a conventional online transaction. As previously stated, this enables a payment card assurance 525 process to be carried out, where it can be determined that the account is in good standing and is associated with the user. If this succeeds, then the card, considered at this point as a digital card, is bound 7200 with the Consumer Identity. This Consumer Identity will typically be an e-mail address, but may also be another identity, such as a mobile phone number. The Consumer Identity is discussed above with reference to FIG. 18. The digital card, however, is not usable at this point. If this step fails, the process stops and the card cannot be used for SRC.

The next determination 7300 is whether the card is available for tokenization. A card will be available for tokenization if it is possible to replace a card PAN with a token. The transaction scheme provider may have defined the ranges of cards that are available for digitization (e.g., in Mastercard™, these are marked in the Mastercard Parameters System). For Mastercard, when MDES receives a digitization request concerning a specific PAN, it call this MPS system to get whether the PAN is in a range that is marked by the Issuer as one that is made available for digitization. That way MDES knows whether it can further direct the request to the issuer to know whether the tokenizable PAN is sufficiently trustworthy to be digitized. Other transaction scheme providers or tokenization services may adopt different solutions with a similar result. If a card is not available for tokenization, then an FPAN-based process must be used, as is discussed below with reference to FIG. 9. If the card is determined 7400 not to be eligible for tokenization then the binding of the digital card and Consumer Identity is rolled back 7450 and the process stopped.

There is a combination of factors that may determine that a card that is available for tokenization is not eligible for digitization since it does not match the risk assessment criteria of the issuer. Those criteria may encompass the following considerations:

Financial—Card's account balance, number of tokens that where already issued in relation with that card, etc.
Device—device considered insecure as per type of storage, software configuration, etc.
(Wallet Provider) Knowledge of the Consumer from non-payment activities, e.g., user account too recent, too many failed attempts for other digitization activities, etc.

If the card is eligible for tokenization, a token is created 7500, and the token is bound 535 to the digital card, but the token is not mapped to the digital card in the "vault". The Token vault is accessed during an authorization of a transaction performed with a token instead of the PAN. The transaction is forwarded by the Acquirer to the transaction scheme infrastructure for authorization. The authorization platform looks at the BIN range, determines that it is a token based range, and knows that first it must detokenize to recover the PAN. This involves going to the Token Vault and reading the value of the real PAN based on the value of the Token. This process of token creation is described above with respect to FIG. 18. The process then proceeds to cardholder assurance and the payment transaction as shown in FIG. 8.

This user authentication, in the form of Cardholder Assurance Data 540, takes place next and is used both for completing the enrollment process and for the transaction. The first step is to determine 8000 who performs the cardholder assurance step. This can be the SRCi service (as for an enrolled card) or local systems following SRC processes. In existing uses of 3D Secure (3DS—3DS2 may also be used below to refer to the current version of 3D Secure, 3D Secure 2.0, which will be used in embodiments of the disclosure), the Merchant triggers the 3DS functionality. If it is SRCi, then the SRC process provides payment credentials 8100 to SRCi, which then may initiate 3DS2 8110 for cardholder assurance (in which case cardholder assurance proceeds as shown in FIG. 6) or if this is not an available option, may submit an authorization request 8120 to the transaction system. If this fails, then cardholder assurance fails and the steps taken to this point are rolled back 8130 and the token is returned to the pool, and the bindings of the token to the digital card and the digital card to the email address are rolled back.

If the local SRC processes have responsibility for cardholder assurance, they next determine 8200 what cardholder assurance method can be used. If it is 3DS2 then this is initiated 8210 by the SRC process and cardholder assurance proceeds as described above with reference to FIG. 6. If another cardholder assurance method is needed, for example, a DP (Digital Platform) Authentication Service is shown as an exemplary option here, then this is invoked 8220, and if found to be successful 8230 then the token is set 8240 in the Consumer Profile, an SRC Payload using the token is computed 8250 to provide a result for use for the UCAF field described elsewhere in this specification, and this is inserted 8260 into an authorization by the SRCi service at the appropriate time.

As shown in FIG. 6, the SRC enrollment and payment process creates an AAV, unless there is no successful cardholder authentication, in which case there is rollback 8130 as previously described. If an AAV is created, there is a determination 8400 whether the AAV is valid. If it is not, then the process will fail and an authorization request will be submitted, but the token cannot be mapped to a FPAN (Funding PAN—PAN physically shown on a card) and the process will stop. If the AAV is valid, there is then a mapping of the token to the digital card in the vault and the digital card is set to be usable, thereby completing the enrollment. SRCi submits an authentication request either directly (if it performed cardholder assurance) or after receiving payment credentials from the SRC process (if that performed cardholder assurance). Payment transaction processing is then carried out.

FIG. 9 indicates that if there is no tokenization, a process for cardholder assurance and payment transaction for an FPAN needs to be carried out. Various mechanisms could be used here—for example, one approach to trigger the setting of a digital card as usable in SRC could use on the Directory Server Transaction ID. This will be inserted in a specific EMV defined data element, such as DE 48 SE 66 subfield 2 of the authorization.

FIG. 10 shows an alternative approach, starting with a determination 1000 that the card is available for tokenization (it lies in a range available to a tokenization provider, such as the Mastercard® Digital Enablement Service (MDES). If there is failure here 1050, a different card must be added. Success leads to an assessment against issuer requirements for tokenization 1100 (FIG. 11), leading to a requirement to add a new card 1150 if this decision is negative. If the decision is positive, a decision 1180 is needed as to whether step-up is needed for tokenization (typically determined by issuer country requirements). Tokenization then takes place with 1250 or without 1200 (FIG. 12) step-up as previously determined with a determination 1300 (FIG. 13) of whether additional authentication is needed if step-up has been used, with tokenization following if no additional authentication is needed. If it is needed, then 3DS2 is used 1500 (FIG. 15) to achieve tokenization, but if it cannot, the tokenization service uses 1400 (FIG. 14) its own ID&V process. A successful result leads to provisioning 1600, activation and storage of the token in the tokenization service for use for SRC, and continuation with payment authentication. Individual elements of this approach are illustrated in FIGS. 11 to 16.

In this approach, the idea of Tokenization Assurance Method (TAM) is significant. TAM is assigned values on the following basis for different categories (Category TAM):

TAM=00. Category TAM will remain at 00 is Cardholder Authentication is performed neither in CardAdd nor in Payment. This represents a low confidence token.

TAM=xx. Category TAM becomes xx>00 if Cardholder Authentication is successfully performed (inApp) by appropriate means (e.g. fingerprint or verification code) and a correct TAV (Tokenization Authentication Value) is made available to CardAdd. This represents a medium confidence token.

TAM=yy. Category TAM becomes yy>xx>00 if Cardholder Authentication is successfully performed at CardAdd by the tokenization service (e.g. MDES) or Issuer with a one time password sent by text or e-mail. This represents a high confidence token.

TAM=zz. Category TAM becomes zz>yy>00 if Cardholder Authentication is successfully performed during Payment with 3DS2 in challenge mode. This represents a strong (very high) confidence token.

Figure 11:
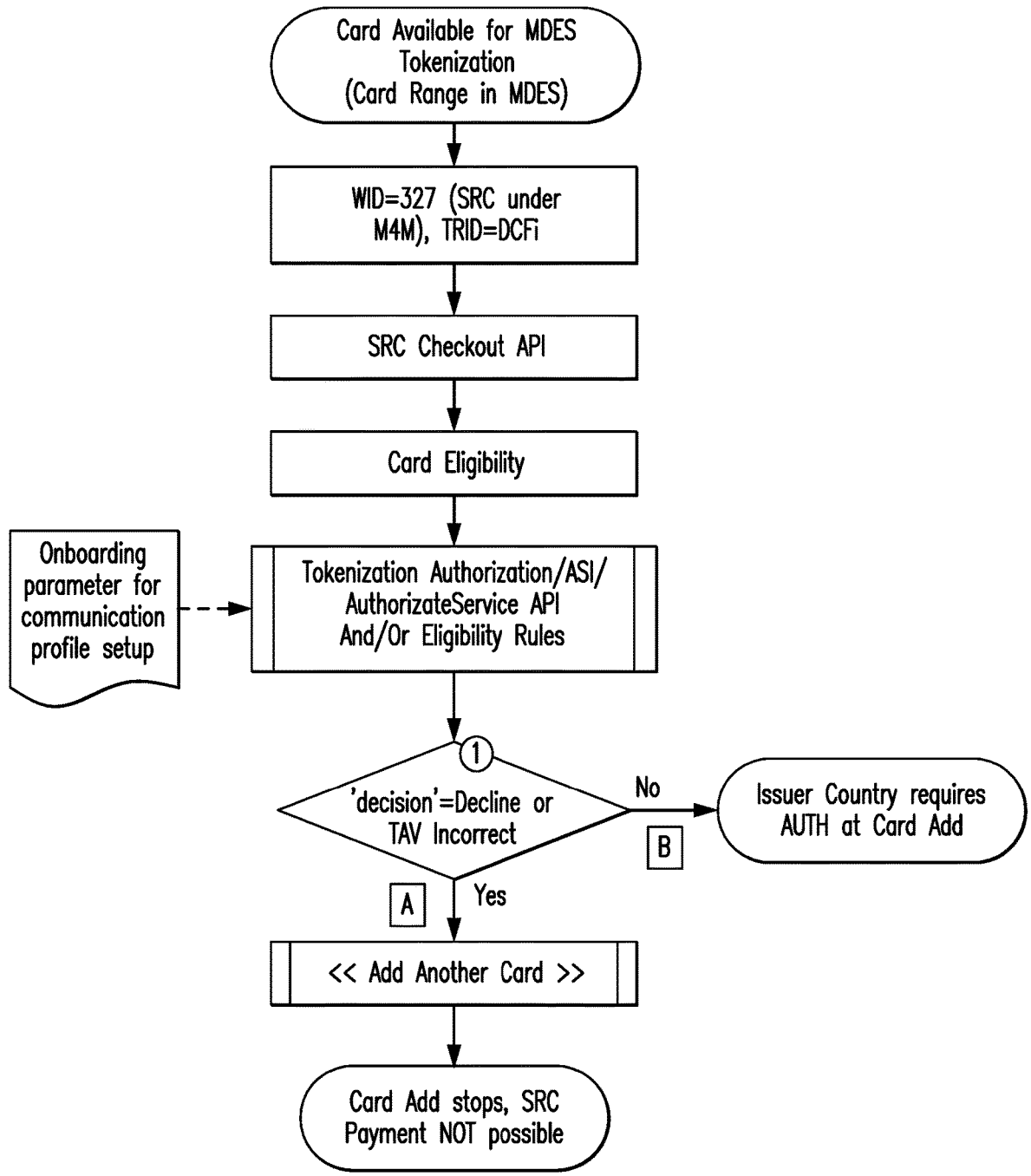
FIGS. 11 to 16 show details of the process flow of FIG. 10.

FIG. 11 relates to refusal of a non-eligible card for MDES tokenization to be enrolled in SRC. This figure, and the figures discussed below, provide examples which are specific to Mastercard® implementations, but which are implementations of an approach equally applicable to other comparable transaction schemes following the same overall functional approach.

An Issuer will want to refuse a non-eligible card for MDES Tokenization to be enrolled in SRC. This enables the Issuer to control the risk associated with creating digital cards for a Cardholder that is not financially sound.

To this end, when Consumer selects the SRC Checkout with a new card that is not in the SRC Candidate List, the SRC will run the MDES Card Eligibility process for the new card, with the following combination of Wallet Identifier (WID) and Token Requestor Identifier (TRID):

WID=327—here this is a specific value used to indicate SRC.
TRID equal to the identifier provided to the Digital Card Facilitator (DCF).

The MDES Card Eligibility process will proceed as for digitization of a card for MDES and the following channels may be depending on the configuration chosen by the Issuer in the MDES Manager:

Tokenization Authorization (TA)
Account Status Information (ASI)
Authorize Service (AS)

MDES Eligibility Rules can run in case of timeout, issuer unavailability, or when Issuer desires further actions on its Decline response.

If MDES Card Eligibility declines the digitization request (i.e., decision of Tokenization authorization is DECLINE) or the Tokenization Authentication Value (TAV) is incorrect, the SRC will not continue with creation and adding to the Consumer Profile of a Digital Card corresponding to the Consumer's selected card, and will instead ask Consumer to attempt to digitize another card. SRC Payment for checkout is not possible using this declined card.

If MDES Card Eligibility does not decline the digitization request and the TAV is correct (if present), then SRC will continue with the next step. This is to analyze the Issuer's Country requirements concerning Cardholder Authentication at Card Add.

Figure 12:
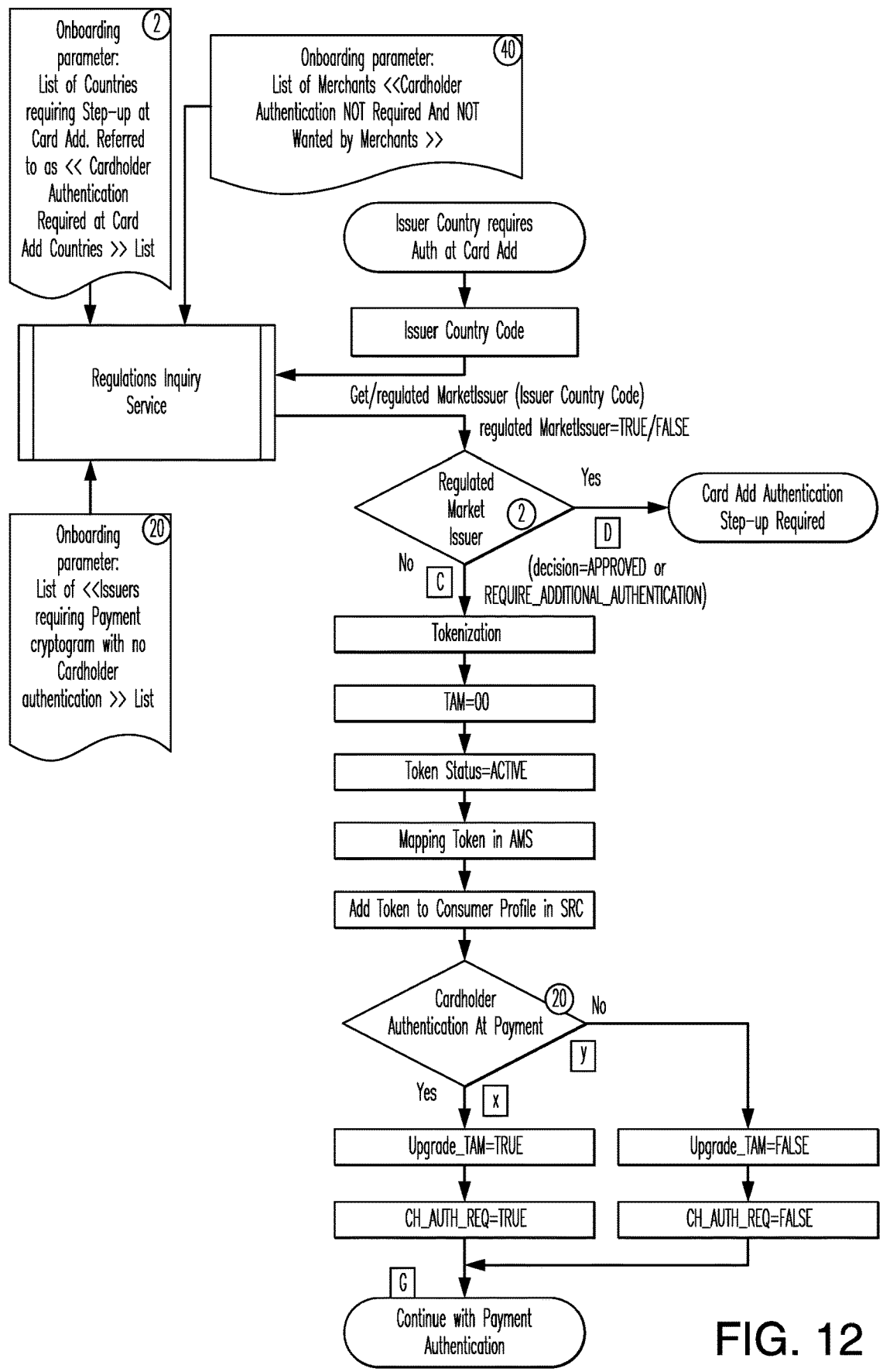

FIG. 12 relates to the Regulations Inquiry Service. This Service acts to determine the need for Cardholder Authentication step-up at Card Add in SRC.

The Regulation Inquiry Service (RIS) wants to determine whether Cardholder Authentication step-up at Card Add in SRC is needed, or not, for a given Issuer Country Code. This enables SRC to comply with market and/or regional requirements (e.g., PSD2 in the EU) concerning the enrollment of one of the Consumer's cards in his Consumer Profile. Step-up may involve use of a second factor, such as a one-time password sent by SMS.

The RIS service is also used for determining regions where Cardholder Authentication is not required by Merchants Configuring Cardholder Authentication step-up at Card Add is of interest not only for SRC but also for other digital services, such as (for Mastercard®) MDES, M4M. This feature can thus be implemented as a generic service which can be inquired by any component of Mastercard® digital environment, like SRC, MDES, M4M, M4C, etc.

RIS will expose a new RESTless API, i.e., GET/regulatedMarketIssuer (IssuerCountryCode), to allow SRC to retrieve regulatedMarketIssuer as a Boolean variable with values of "TRUE/FALSE" in the API response to indicate whether the Card belongs to:

a Non-regulated Market Issuer, which is an issuer whose Issuer Country Code is not listed in the "Cardholder Authentication Required at Card Add Countries" white list; or a Regulated Market Issuer, which is an issuer whose Issuer Country Code is listed in the "Cardholder Authentication Required at Card Add Countries" white list.

The "Cardholder Authentication Required at Card Add Countries" is a list enumerating the ISO 3166-1 numeric Country Codes of those countries where the local financial regulations impose as mandatory Cardholder Authentication step-up at Card Add.

The local financial regulations can be determined by national financial organizations (like UK Cards in UK, or Bancontact in Belgium) or by regional institutions (like the European Union Commission, imposing the PDS2 norm to the member countries).

The SRC System administrator is the role that configures this list with input from Legal and Data Governance.

FIG. 12 also shows Addition with no assurance of a low confidence Token corresponding to an SRC Digital Card to a Consumer Profile.

A non-regulated market Issuer will want to add, with no assurance, a low confidence token corresponding to an SRC Digital Card to a Consumer Profile for greatest convenience for SRC adoption when the Issuer has either approved or required additional authentication on the tokenization of an SRC card.

A non-regulated market Issuer will not have its Issuer Country Code in the "Cardholder Authentication Required at Card Add Countries" white list.

Therefore, SRC will continue the Card Add processing using the "No" branch of the decision box "Regulated Market Issuer", where it arrives with a digitization decision of either "Approved" or "Require_Additional_Authentication" from the previous processing.

SRC will discard the presence of any Activation Method List, if any, which could have been provided in the response to the TA or AS response from the Tokenization demand. As such, there will be no Activation Method to be proposed for execution to the Cardholder.

As noted above, low confidence Token is a Token whose Category Token Assurance Method (TAM) has value "00" (zero).

SRC will:
Generate a low confidence Token corresponding to the Digital Card,
Map the Token to the Digital Card, and
Add the Token in the Consumer Profile.

To instruct for the further interaction with the SRC Payment event and SRC Payload event, the SRC will communicate the following two status variables from the Card Add phase:

Upgrade_TAM—This status variable says whether the Category TAM value must be increased after the successful completion of the Payment Authentication, as follows:
TRUE=Upgrade Category TAM later after the successful execution of the Payment Authentication, when the Category TAM will be granted the value "zz", tbd, as the highest confidence degree.
FALSE=Do NOT upgrade Category TAM later, since Category TAM was already set to a positive value (>00) since the Card Add phase, when the Category TAM is granted the value "xx" (for MDES TAV) and yy (for MDES OTP)—see Category TAM—Value Assignment Policy on Page-0.
CH_AUTH_REQ—This status variable indicates whether the Cardholder Authentication is required to be performed during the Payment phase of SRC:
TRUE=Cardholder Authentication must be performed during Payment
FALSE=Cardholder Authentication is NOT required during Payment In the particular situation of this feature, the two variables are set by SRC as follows:

If the Issuer chooses to perform "Cardholder Authentication at Payment" then:
Upgrade_TAM=TRUE (with an initial Category TAM set to "00"), when Cardholder Authentication is successful in Payment.
CH_AUTH_REQ=TRUE, since there was no Cardholder Authentication performed at Card Add and as such a Cardholder Authentication is asked in Payment for Cardholder's security.
The Token is ready to transact in an SRC Checkout Payload event for a Liability Shift cryptogram with Cardholder Authentication, produced by 3DS2 in challenge mode.

If the Issuer chooses not to perform "Cardholder Authentication at Payment" then:
Upgrade_TAM=FALSE (with an initial Category TAM set to "00"), and with no need of upgrading the Category TAM.
CH_AUTH_REQ=FALSE, since there was no Cardholder Authentication performed at Card Add but the Cardholder Authentication is not asked in Payment.
The Token is ready to transact in an SRC Checkout Payload event with: a) a Liability Shift cryptogram without Cardholder Authentication, produced by 3DS2 RBA in friction-less mode, if the Issuer is listed in the List of "Issuers requiring Payment cryptogram with no Cardholder Authentication" (see the onboarding parameter designated 20 in FIG. 12), or b) a Liability Shift cryptogram, produced with the Issuers ACS in the 3DS2 protocol.

Figure 13:
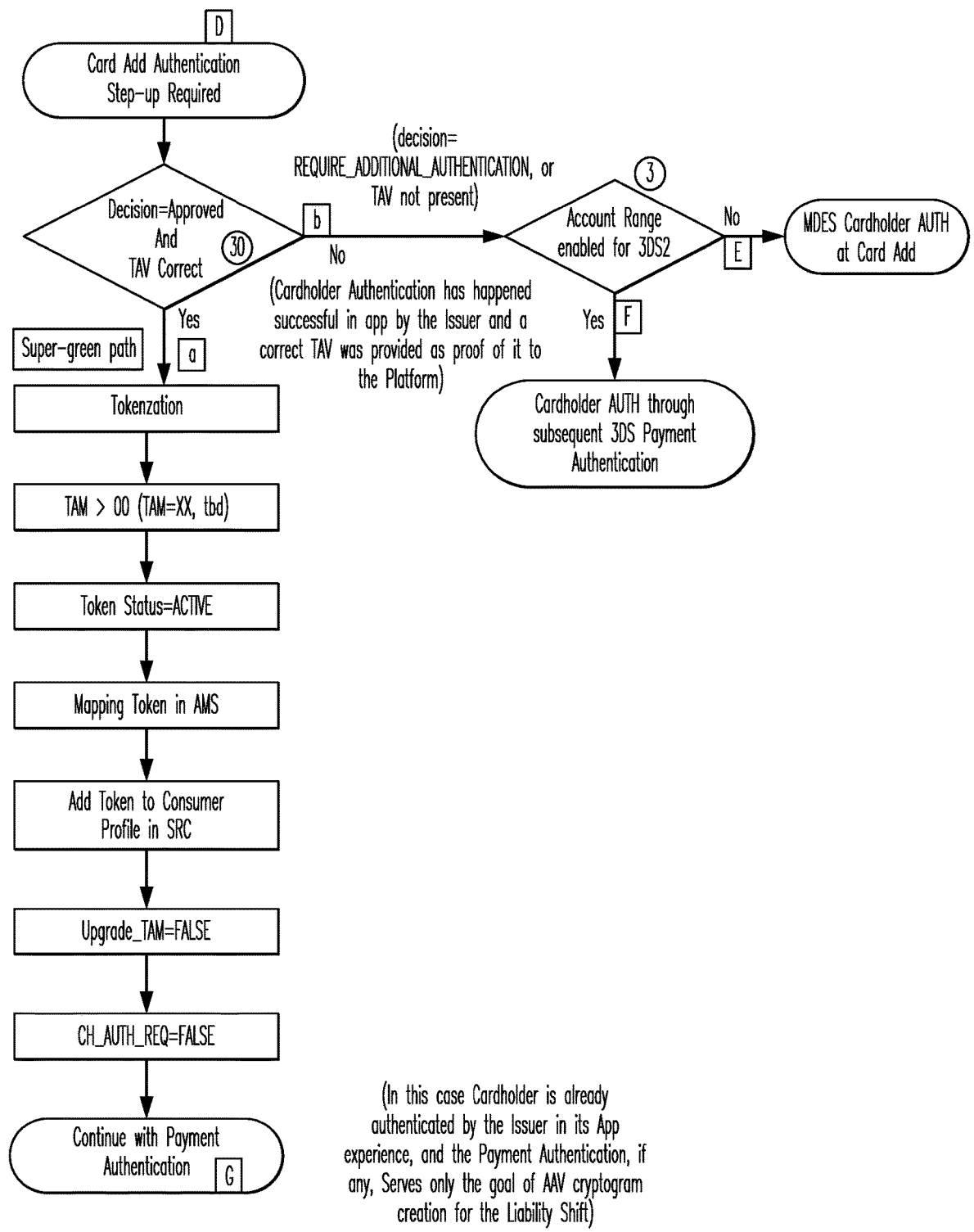

FIG. 13 relates to an addition with no assurance of a medium confidence Token corresponding to an SRC Digital Card to a Consumer Profile.

A regulated market Issuer will want to add, with no assurance, a medium confidence Token corresponding to an SRC Digital Card to a Consumer Profile for greatest Consumer convenience for SRC adoption when it has approved the tokenization of an SRC card beforehand with a TAV.

A regulated market Issuer will have its Issuer Country Code in the "Cardholder Authentication Required at Card Add Countries" white list.

Therefore, SRC will continue the Card Add processing on the "Yes" branch of the decision box "Regulated Market Issuer".

The detailed processing is shown for FIG. 13 on the connector "Card Add Authentication Step-up Required". When it arrives at this point, the digitization decision is either "Approved and TAV Correct" or "Require_Additional_Authentication, or TAV not present" from the previous MDES Card Eligibility phase.

Where the decision was "Approved and TAV correct" with an Issuer App experience for the Cardholder Authentication (with either fingerprint or Verification Code), then SRC will discard the presence of any Activation Method List returned in the Tokenization response, if any, which could have been provided in the TA response or AS response. As such, there will be no Activation Method to be proposed for execution to the Cardholder.

A medium confidence Token is a Token passing MDES Issuer App ID&V with correct TAV for which the Category TAM=xx>00

SRC will:
Generate a medium confidence Token corresponding to the Digital Card,
Map the Token to the Digital Card, and
Add the Token in the Consumer Profile.

To instruct for the further interaction with the SRC Payment event and SRC Payload event, the SRC will communicate the following two status variables from the Card Add:

Upgrade_TAM—This status variable says whether the Category TAM value must be increased after the successful completion of the Payment Authentication, as follows:
TRUE=Upgrade Category TAM later after the successful execution of the Payment Authentication, when the Category TAM will be granted the value "zz", tbd, as the highest confidence degree.
FALSE=Do NOT upgrade Category TAM later, since Category TAM was already set to a positive value (>00) since the Card Add phase, when the Category TAM is granted the value "xx" (for MDES TAV) and yy (for MDES OTP)

CH_AUTH_REQ—This status variable indicates whether the Cardholder Authentication is required to be performed during the Payment phase of SRC:
TRUE=Cardholder Authentication must be performed during Payment
FALSE=Cardholder Authentication is NOT required during Payment In the particular situation of this feature, the two variables are set by SRC as follows:
Upgrade_TAM=FALSE—TAM is not required to be augmented by successive Payment Authentication with 3DS2.
CH_AUTH_REQ=FALSE, since there was successful Cardholder Authentication performed with inApp experience by the Issuer/designated application whose TAV successful result was transmitted to Card Add. There is no need of Payment Authentication with 3DS2 in challenge mode The Token is ready to transact in an SRC Checkout Payload event for getting the required payment cryptogram with 3DS2 RBA for liability shift.

Figure 14:
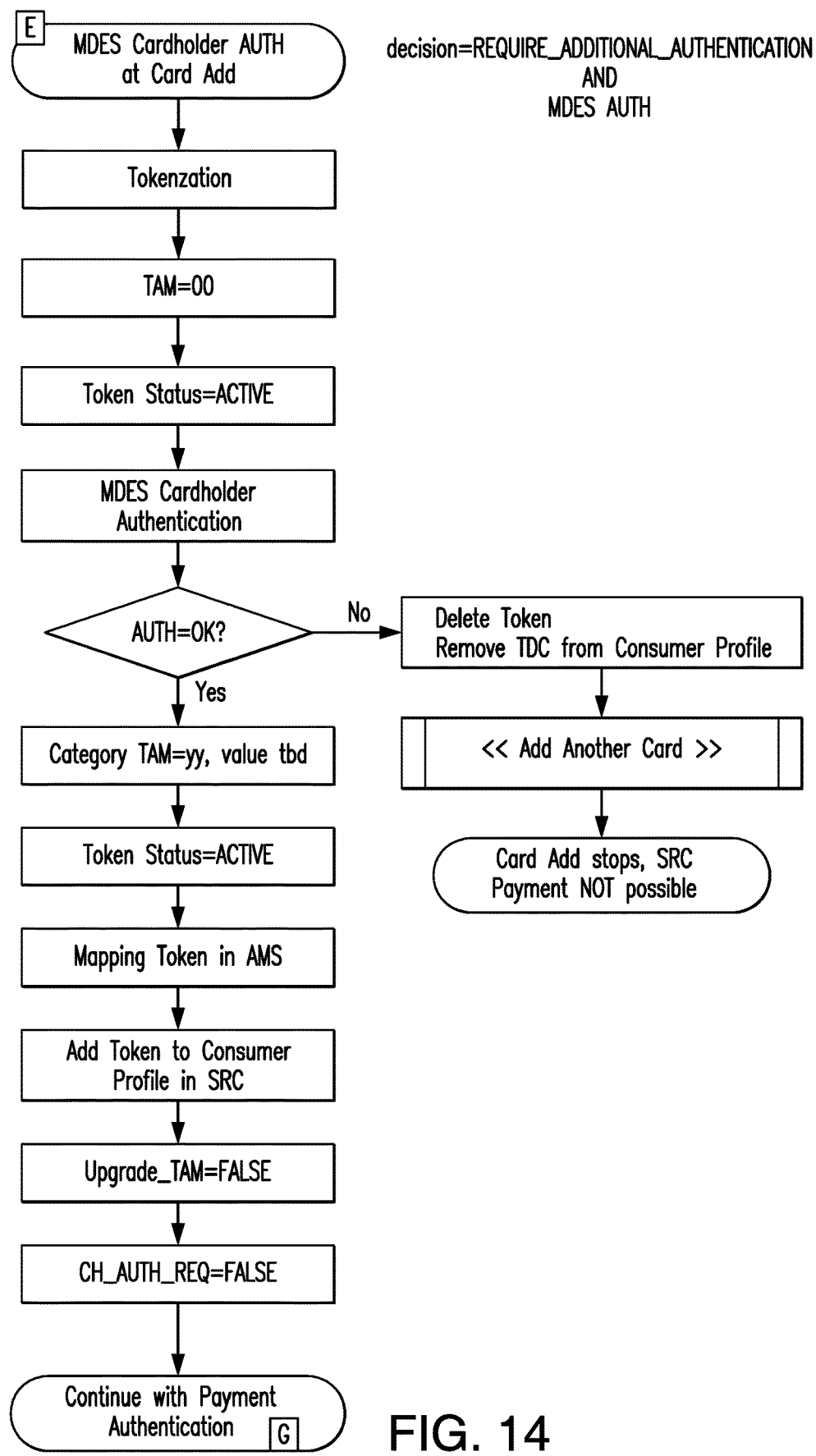
Figure 15:
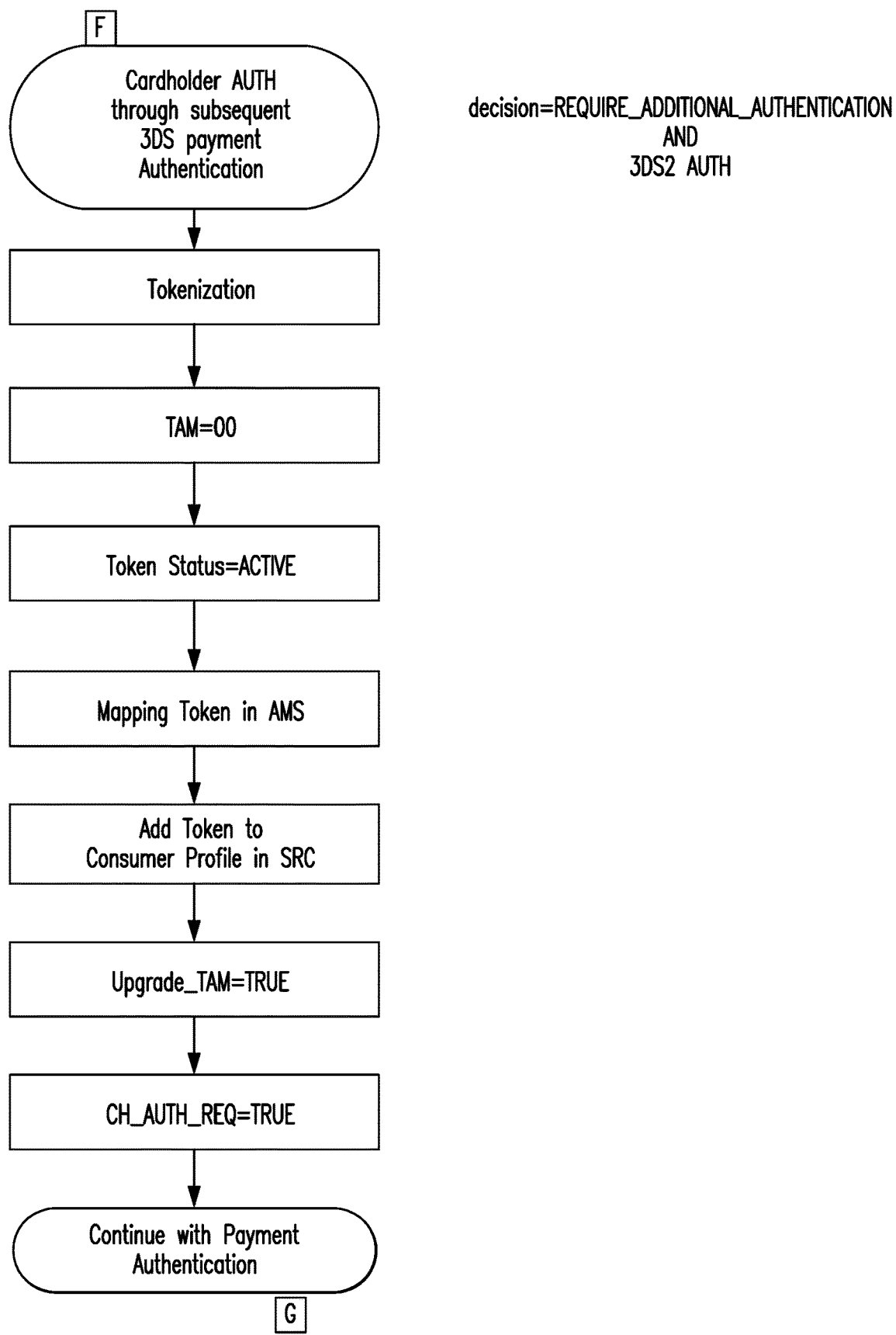
Figure 16:
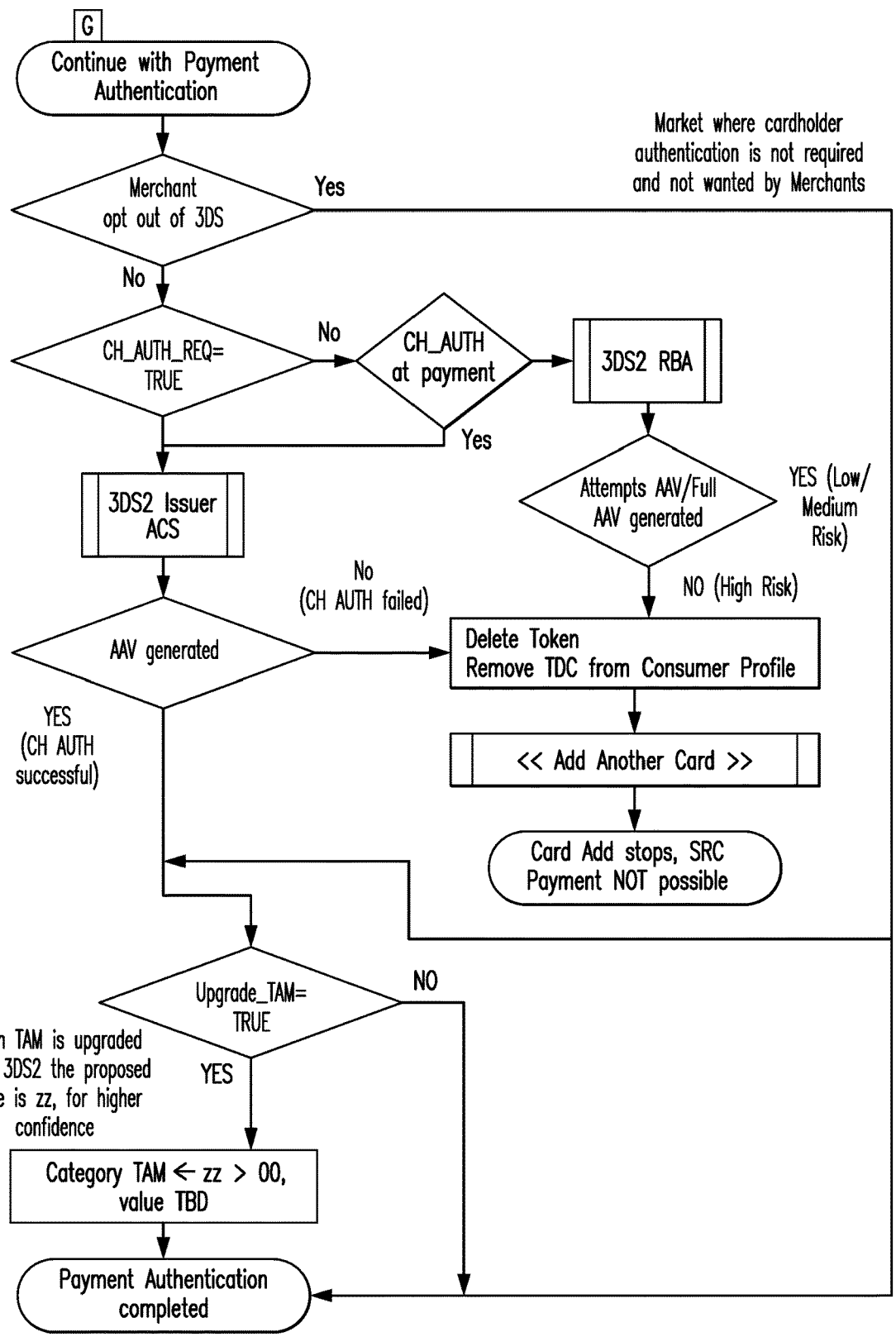

FIG. 14 relates to a regulated market Issuer adding with MDES Cardholder Authentication assurance a high confidence Token corresponding to an SRC Digital Card to a Consumer Profile such that it will stand Merchant liability shift when payment is performed with the Token associated with the SRC Digital Card.

A regulated market Issuer that does not have an account range activated for 3DS2 Payment Authentication will continue to rely on the ID&V methods supported by MDES when generating and mapping a Token linked to a Digital Card from that range and when adding the Token to the Consumer Profile.

When it arrives at this point, SRC will have obtained the Card Eligibility decision "REQUIRE_ADDITIONAL_AUTHENTICATION" and would know the Activation Methods List to present to the Cardholder.

SRC triggers the generation of a low confidence Token (TAM=00).

To get a high confidence level in the Token, the SRC will call the MDES Cardholder Authentication with the Activation Method List it obtained from the TA response or AS response, or from the by-standing requestActivationMethods API (aka RAM API).

After the execution of the selected Activation Method, MDES evaluates the result of the Authentication process:

If unsuccessful, the Cardholder is required to retry the same method or if the number of retrials is overpassed he/she is required to attempt the adding of another card.

If successful, SRC will:
Map the Token to the Digital Card, and
Add the Token in the Consumer Profile.

To instruct for the further interaction with the SRC Payment event and SRC Payload event, the SRC will communicate the following two status variables from the Card Add:

Upgrade_TAM—This status variable says whether the Category TAM value must be increased after the successful completion of the Payment Authentication, as follows:
TRUE=Upgrade Category TAM later after the successful execution of the Payment Authentication, when the Category TAM will be granted the value "zz", tbd, as the highest confidence degree.
FALSE=Do NOT upgrade Category TAM later, since Category TAM was already set to a positive value (>00) since the Card Add phase, when the Category TAM is granted the value "xx" (for MDES TAV) and yy (for MDES OTP)
CH_AUTH_REQ—This status variable indicates whether the Cardholder Authentication is required to be performed during the Payment phase of SRC:
TRUE=Cardholder Authentication must be performed during Payment
FALSE=Cardholder Authentication is NOT required during Payment In the particular situation of this feature, the two variables are set by SRC as follows:
Upgrade TAM=FALSE'—TAM is not required to be augmented by successive Payment Authentication with 3DS2 since it already has the Category TAM=yy>0.
CH_AUTH=FALSE, since there was successful Cardholder Authentication performed with MDES OTP experience by the MDES and Issuer. There is no need for Payment Authentication with 3DS2 in challenge mode FIG. 15 relates to addition with 3DS2 Payment Authentication assurance a high confidence Token corresponding to an SRC Digital Card to a Consumer Profile A regulated market Issuer will want to add with 3DS2 Payment Authentication assurance a high confidence Token corresponding to an SRC Digital Card to a Consumer Profile such that it can stand Merchant liability shift when 3DS2 payment is performed with the Token associated to the SRC Digital Card.

A regulated market Issuer that has an account range activated for the 3DS2 Payment Authentication will rely on 3DS2 when generating and mapping a Token linked to a Digital Card from that range and when adding the Token to the Consumer Profile.

When it arrives at this point of the processing, SRC will have obtained the Card Eligibility decision "REQUIRE_ADDITIONAL_AUTHENTICATION or TAV not present" and would know that it has to pass hand to the 3DS2 processing to either the SRC platform or to that of the Merchant, depending on the Merchant Configuration.

SRC will:
Trigger the generation of a low confidence Token (TAM=00).
Map the Token to the Digital Card, and
Add the Token in the Consumer Profile.

To instruct for the further interaction with the SRC Payment event and SRC Payload event, the SRC will communicate the following two status variables from the Card Add:

Upgrade_TAM—This status variable says whether the Category TAM value must be increased after the successful completion of the Payment Authentication, as follows:
TRUE=Upgrade Category TAM later after the successful execution of the Payment Authentication, when the Category TAM will be granted the value "zz", tbd, as the highest confidence degree.
FALSE=Do NOT upgrade Category TAM later, since Category TAM was already set to a positive value (>00) since the Card Add phase, when the Category TAM is granted the value "xx" (for MDES TAV) and yy (for MDES OTP)
CH_AUTH_REQ—This status variable indicates whether the Cardholder Authentication is required to be performed during the Payment phase of SRC:
TRUE=Cardholder Authentication must be performed during Payment FALSE=Cardholder Authentication is NOT required during Payment SRC continues with Payment Authentication and it will set the two variables as follows:

Upgrade_TAM=TRUE—TAM is required to be augmented by successive Payment Authentication with 3DS2 to a Category TAM=zz>00 (tbd)

CH_AUTH_REQ=TRUE—The Cardholder Authentication was NOT performed by MDES and the Payment Authentication with 3DS2 is called in ACS mode for the authentication of the Cardholder and the creation of a payment cryptogram.

As noted above, FIG. 16 illustrates a process for Token Assurance Method (TAM) upgrading on card add. As can be seen, the successful generation of an AAV (whether by an Issuer ACS or by appropriate RBA) allows the TAM to be upgraded to indicate a suitably high level of assurance.

FIGS. 19A to 19F show how various working modes can be configured, depending on various market requirements, such that only one Cardholder authentication is performed for regardless which path in the tree is taken. FIG. 19A shows the general case, with FIGS. 19B to 19G indicating the flow for different working modes.

Figure 19B:
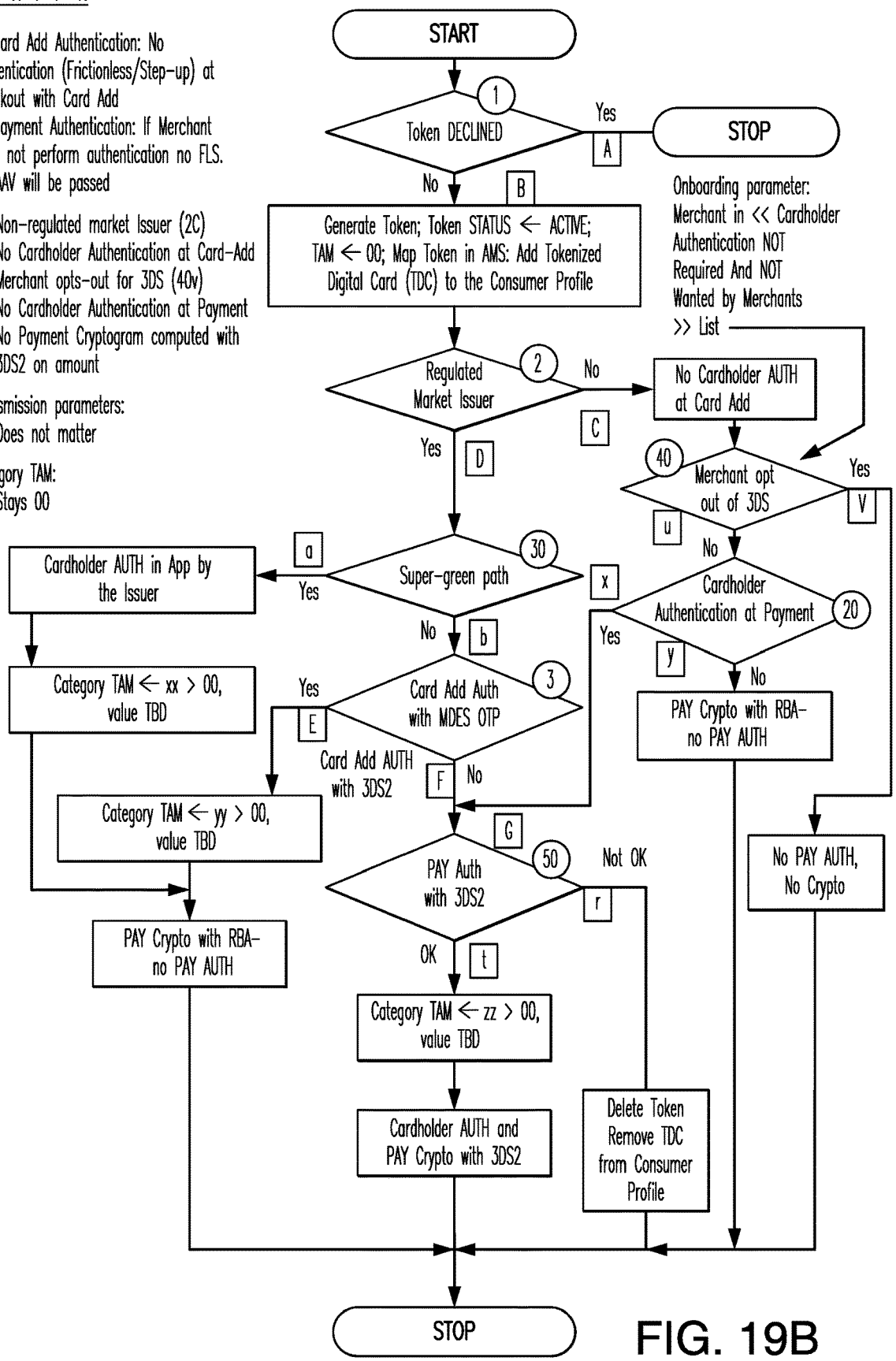

For FIG. 19B, there is no authentication at Card Add and the Merchant does not require cardholder authentication (and opts out from 3DS) and there is a non-regulated market Issuer. TAM is 00.

Figure 19C:
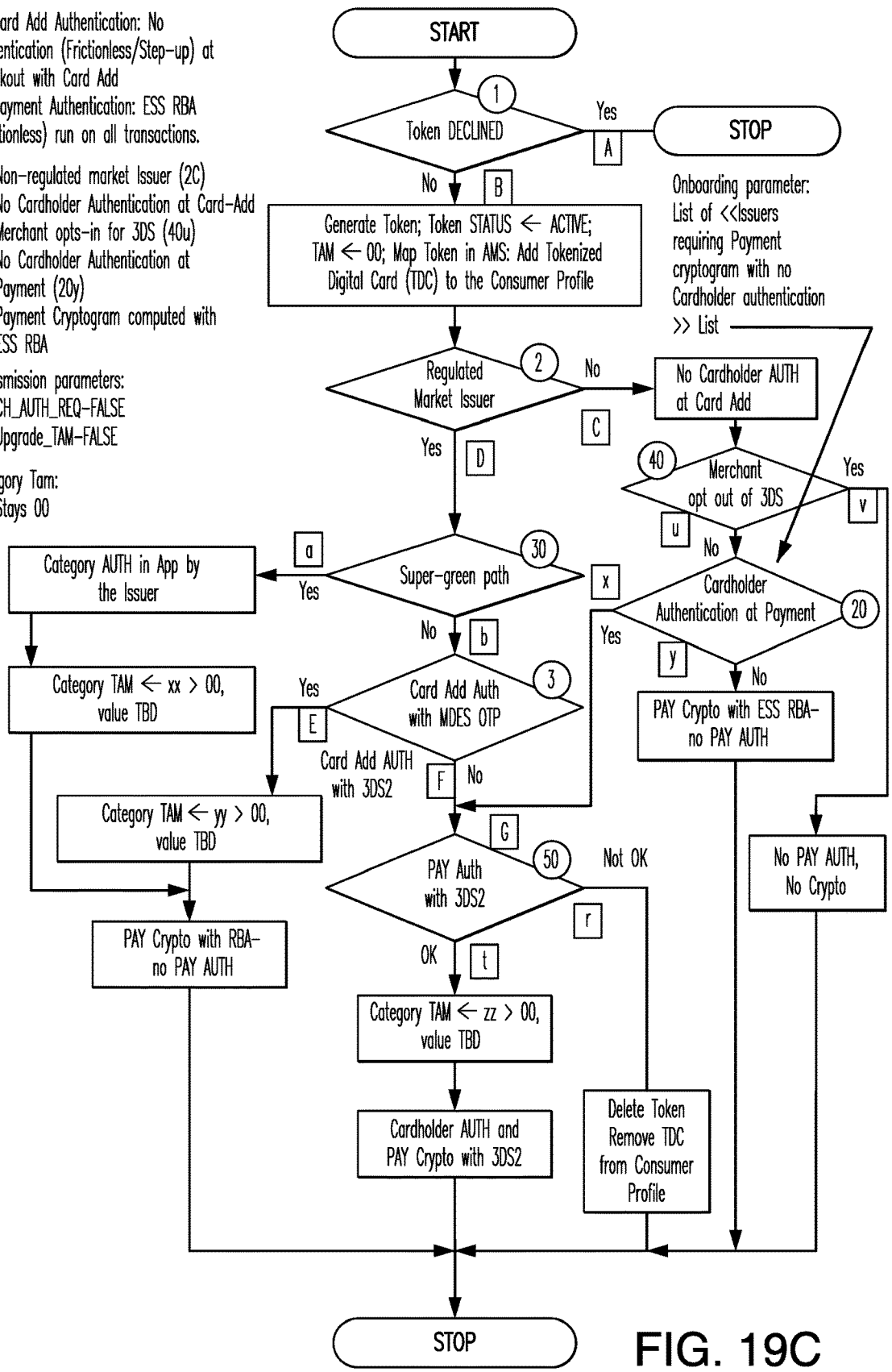

FIG. 19C also has no authentication at Card Add, but now a risk-based assessment is required for all transactions. The Merchant opts in to 3DS and a payment cryptogram is commuted. TAM is still 00.

Figure 19D:
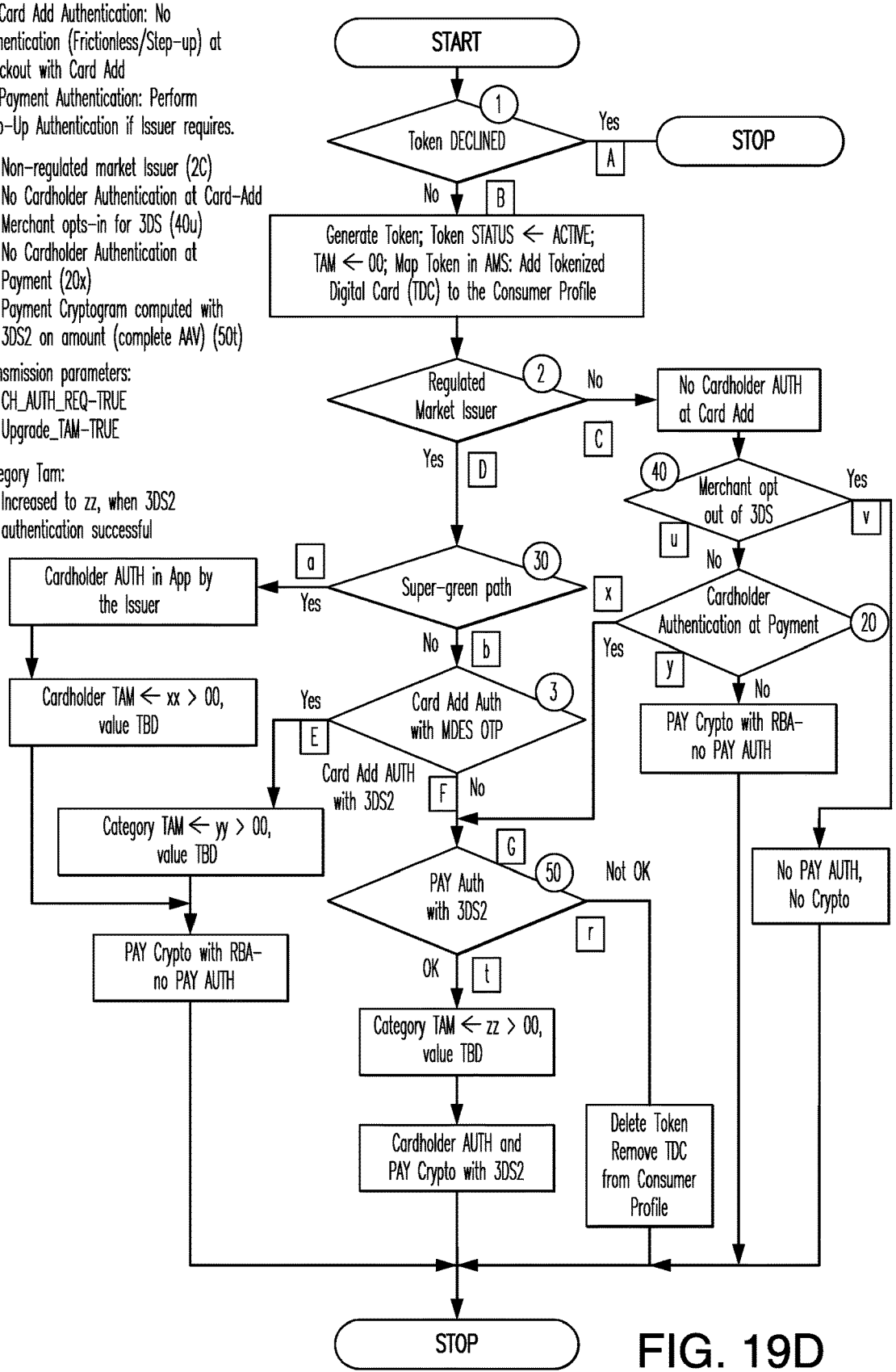

FIG. 19D is similar to FIG. 19C but now provides for step-up authentication if required by the Issuer. There is cardholder authentication at payment, and the TAM is upgraded to zz.

Figure 19E:
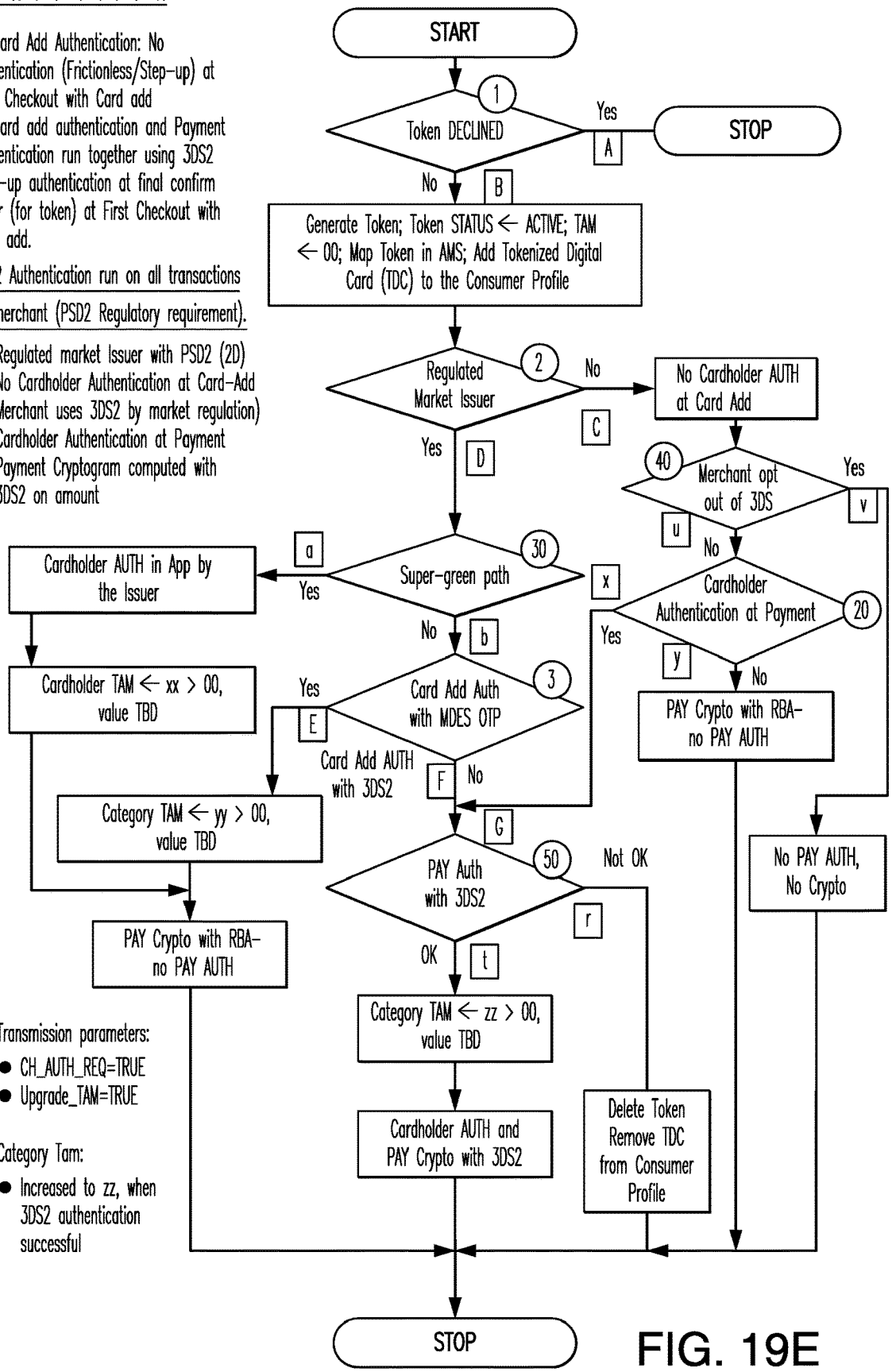

FIG. 19E is similar to FIG. 19D, but now authentication and payment are run together using 3DS2, with 3DS2 being used for all transactions. TAM is again upgraded to zz.

Figure 19F:
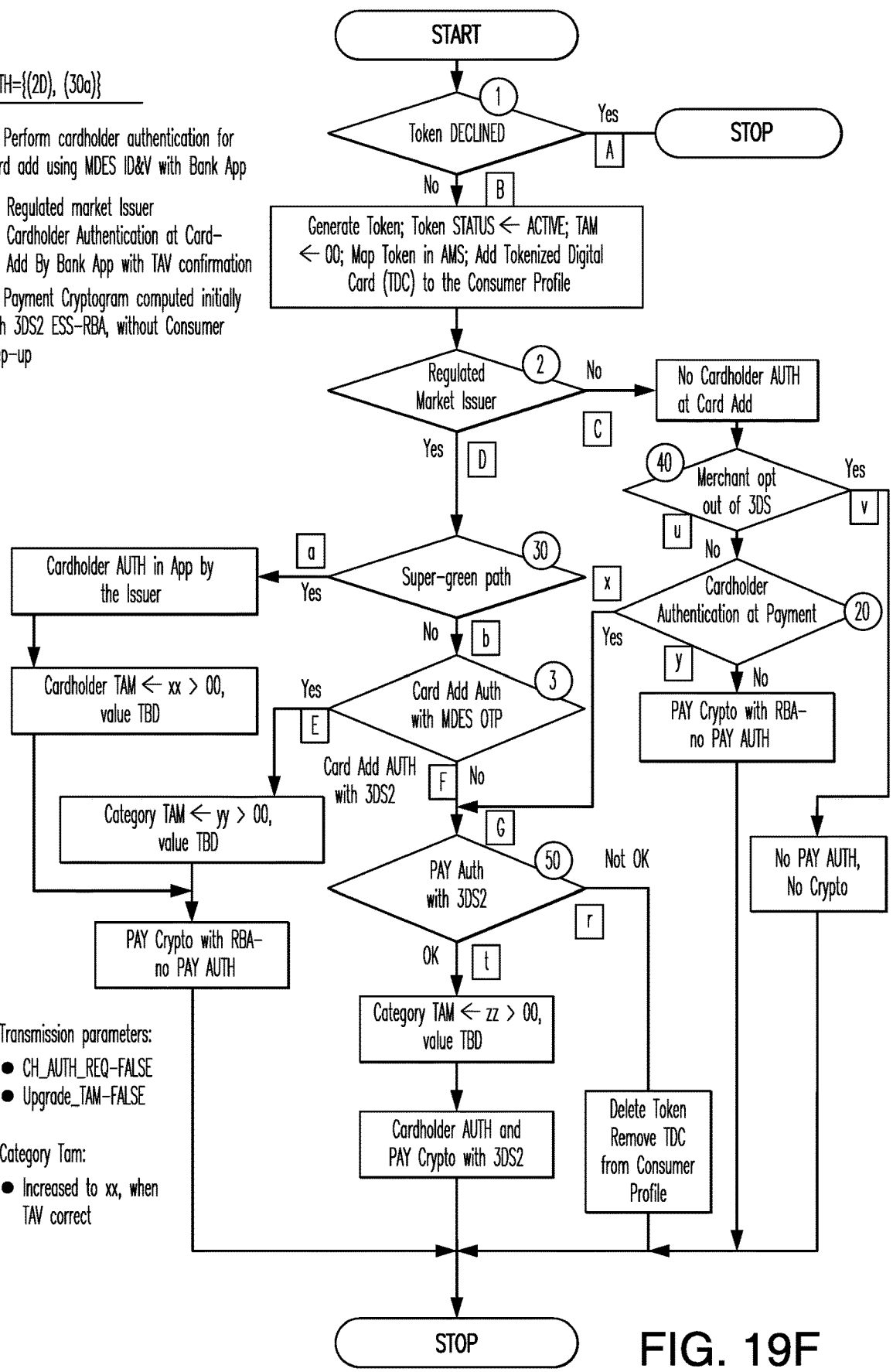

For FIG. 19F, interim MDES ID&V is used. This is for cases where the Issuer has not yet adopted 3DS2. Here this will apply to a regulated Issuer but without step-up. TAM may be upgraded to xx (if TAV is correct).

Figure 19G:
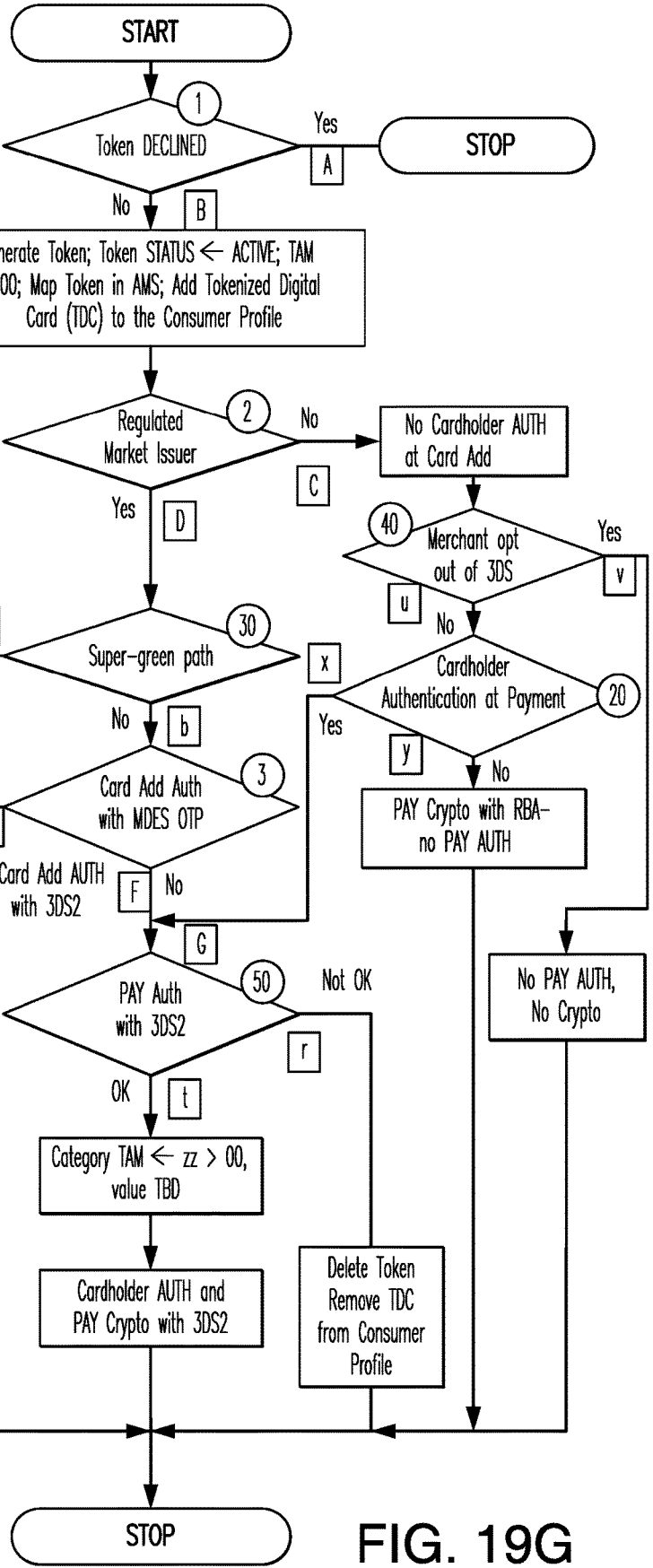

FIG. 19G is similar to FIG. 19F, but instead of RBA uses a one-time password provided by SMS.

As the person skilled in the art will appreciate, modifications and variations to the above embodiments may be provided, and further embodiments may be developed, without departing from the spirit and scope of the disclosure. Reference to standards and proprietary technologies are provided for the purpose of describing effective implementations, and do not limit the scope of the disclosure.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of establishing a digital identity for use with an online service and for subsequently using the digital identity to perform the online service, the method comprising:

receiving, by a transaction infrastructure computing device, a digital identity of a user and payment device details specific to a payment account of the user from a user computing device, the digital identity including at least one of an email address and/or a mobile phone number of the user computing device, the payment device details including a primary account number (PAN) for the payment account;

partially enrolling, by the transaction infrastructure computing device, the digital identity for the online service by:

binding the digital identity to the user computing device;

binding at least the PAN, as a digital card for the payment account, to the digital identity; and creating a token specific to the payment account; and binding the token to the digital identity, but not mapping the token to the digital card in a token vault associated with the token, whereby enrolling the digital identity is to be completed and the digital card is to be available for use in the online service, in response to later authentication of the user through the user computing device associated with the digital identity;

after partially enrolling the digital identity, authenticating the user through the user computing device associated with the digital identity for a first instance of the online service, whereby a user authentication result is generated based on the token and indicative of a successful user authentication; and in response to the user authentication result being indicative of the successful user authentication:

mapping, by the transaction infrastructure computing device, the token to the digital card in the token vault;

setting the digital card as usable, thereby completing the enrollment of the digital identity; and performing the first instance of the online service for the digital identity, via the token, wherein the user authentication result authenticates the digital identity for said first instance of the online service and also completes enrollment of the digital identity for the online service.

2. The method of claim 1, wherein the online service relates to online payment.

3. The method of claim 2, wherein partially enrolling the digital identity further comprises providing the payment device details.

4. The method of claim 2, wherein the online service relates to payment according to a chip card protocol.

5. The method of claim 4, wherein the online service comprises a secure e-commerce platform, and wherein the user authentication comprises an enhanced authentication protocol.

6. A system for establishing a digital identity for use with an online service and for subsequently using the digital identity to perform the online service, the system comprising:

a transaction infrastructure computing device configured to:

receive a digital identity of a user and payment device details specific to a payment account of the user from a user computing device, the digital identity including at least one of an email address and/or a mobile phone number of the user computing device, the payment device details including a primary account number (PAN) for the payment account;

partially enroll the digital identity for the online service, wherein to partially enroll the digital identity for the online service, the transaction infrastructure computing device is configured to:

bind the digital identity to the user computing device;

bind at least the PAN, as a digital card for the payment account, to the digital identity;

create a token specific to the payment account; and bind the token to the digital identity, but not mapping the token to the digital card in a token vault associated with the token, whereby enrolling the digital identity is to be completed and the digital card is to be available for use in the online service in response to later authentication of the user through the user computing device associated with the digital identity;

after partially enrolling the digital identity, authenticate the user through the user computing device associated with the digital identity for a first instance of the online service, whereby a user authentication result is generated based on the token and is indicative of a successful user authentication; and in response to the user authentication result indicative of the successful user authentication:

map the token to the digital card;

set the digital card as usable, thereby completing the enrollment of the digital identity; and perform the first instance of the online service for the digital identity, via the token, wherein the user authentication result authenticates the digital identity for said first instance of the online service and also completes enrollment of the digital identity for the online service.

7. The system of claim 6, wherein the online service relates to online payment.

8. The system of claim 7, wherein the online service relates to payment according to a chip card protocol.

9. The system of claim 7, wherein the online service comprises a secure e-commerce platform, and wherein the user authentication comprises an enhanced authentication protocol.

* * * * *